US012634401B2

(12) United States Patent
Miura

(10) Patent No.: US 12,634,401 B2
(45) Date of Patent: May 19, 2026

(54) INSPECTION SYSTEM AND METHOD OF CONTROLLING THE SAME, AND STORAGE MEDIUM THAT DETERMINE WHETHER A CONTINUOUS IMAGE DEFECT HAS OCCURRED

(71) Applicant: CANON KABUSHIKI KAISHA, Tokyo (JP)

(72) Inventor: Riko Miura, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 189 days.

(21) Appl. No.: 18/417,104

(22) Filed: Jan. 19, 2024

(65) Prior Publication Data

US 2024/0259502 A1     Aug. 1, 2024

(30) Foreign Application Priority Data

Feb. 1, 2023     (JP) .................................. 2023-014173

(51) Int. Cl.
*H04N 1/00*          (2006.01)

(52) U.S. Cl.
CPC ..... *H04N 1/00029* (2013.01); *H04N 1/00005* (2013.01); *H04N 1/00013* (2013.01); *H04N 1/00037* (2013.01); *H04N 1/00087* (2013.01)

(58) Field of Classification Search
CPC ........... H04N 1/00029; H04N 1/00005; H04N 1/00013
See application file for complete search history.

(56) References Cited

U.S. PATENT DOCUMENTS

2011/0019244 A1* 1/2011 Uwatoko ........... H04N 1/00053
                                            358/448
2014/0002842 A1    1/2014 Ito
                   (Continued)

FOREIGN PATENT DOCUMENTS

JP          2008-282003 A      11/2008
JP          2009-300695 A      12/2009
                   (Continued)

OTHER PUBLICATIONS

Extended European Search Report issued Jun. 28, 2024, in corresponding EP Patent Application No. 24153642.4 (24 pages).
(Continued)

*Primary Examiner* — Ibrahim Siddo
(74) *Attorney, Agent, or Firm* — Venable LLP

(57) ABSTRACT

An inspection system including a printing apparatus, an inspection apparatus, and controllers to cause a reading device to read a printed matter, for which the printing apparatus has printed an image on a recording sheet, to obtain image data, to obtain a shift amount between a preceding first recording sheet and a following second recording sheet in a direction orthogonal to a conveyance direction of a recording sheet used for printing, to detect an image defect in the obtained image data, and to diagnose a failure location of the printing apparatus based on an inspection detection result. The diagnosis determines whether a continuous image defect has occurred based on a position of an image defect in the preceding first recording sheet and a position of an image defect in the following second recording sheet. The obtained shift amount and the failure location are diagnosed based on the determined image defect.

17 Claims, 18 Drawing Sheets

(56)  References Cited

U.S. PATENT DOCUMENTS

| 2019/0129342 A1* | 5/2019 | Ikeda | G03G 15/556 |
| 2021/0264230 A1* | 8/2021 | Murayama | G06K 15/408 |

FOREIGN PATENT DOCUMENTS

| JP | 2011-029794 A | 2/2011 |
| JP | 2014117841 A | 6/2014 |
| JP | 2017-040758 A | 2/2017 |
| JP | 2017-138445 A | 8/2017 |
| JP | 2017-191294 A | 10/2017 |
| JP | 2018-132719 A | 8/2018 |
| JP | 2019149078 A | 9/2019 |

OTHER PUBLICATIONS

JP Search Report issued Dec. 20, 2024, in corresponding Japanese Patent Application No. 2023-014173, with English translation (21 pages).

Reasons for Refusal issued Jan. 17, 2025, in corresponding Japanese Patent Application No. 2023-014173, with English translation (8 pages).

* cited by examiner

F I G. 6
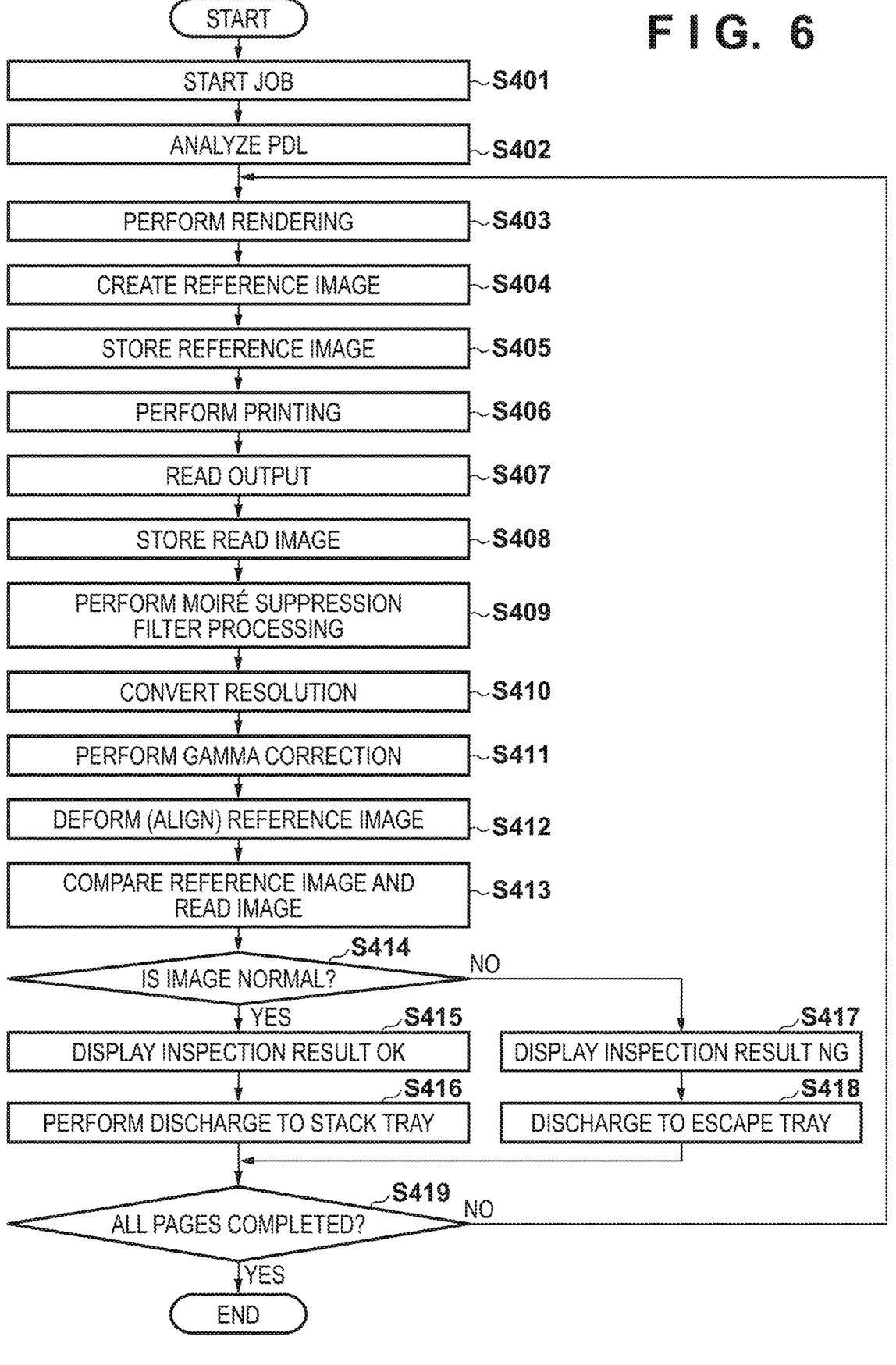

F I G. 7A
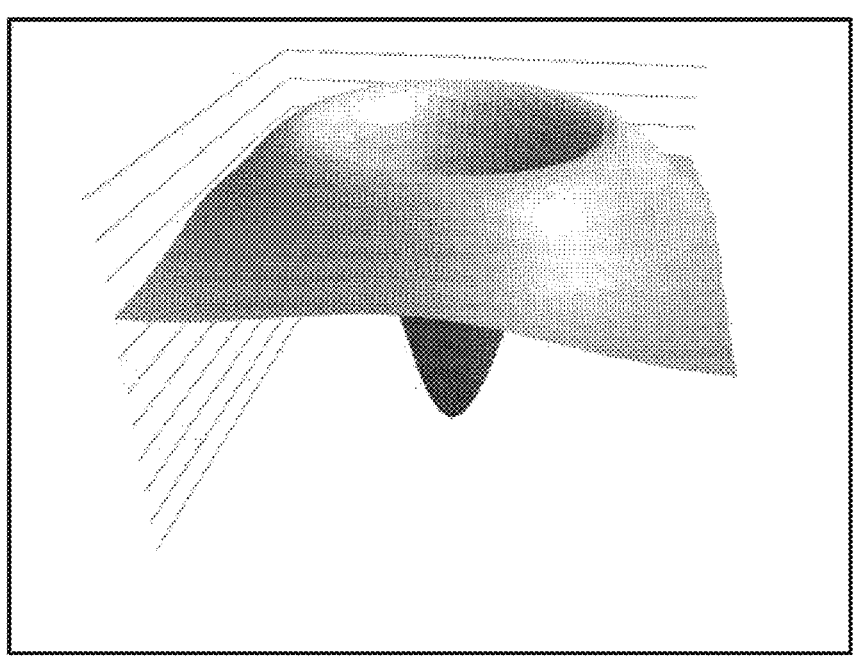
F I G. 7B
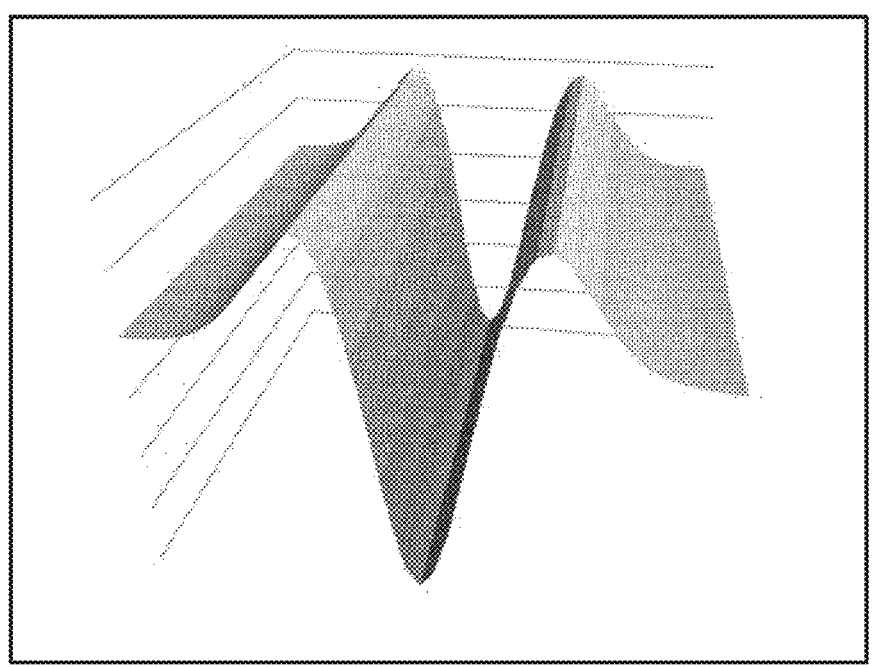

F I G. 9A
F I G. 9B
DURING IMAGE READING
DURING INSPECTION
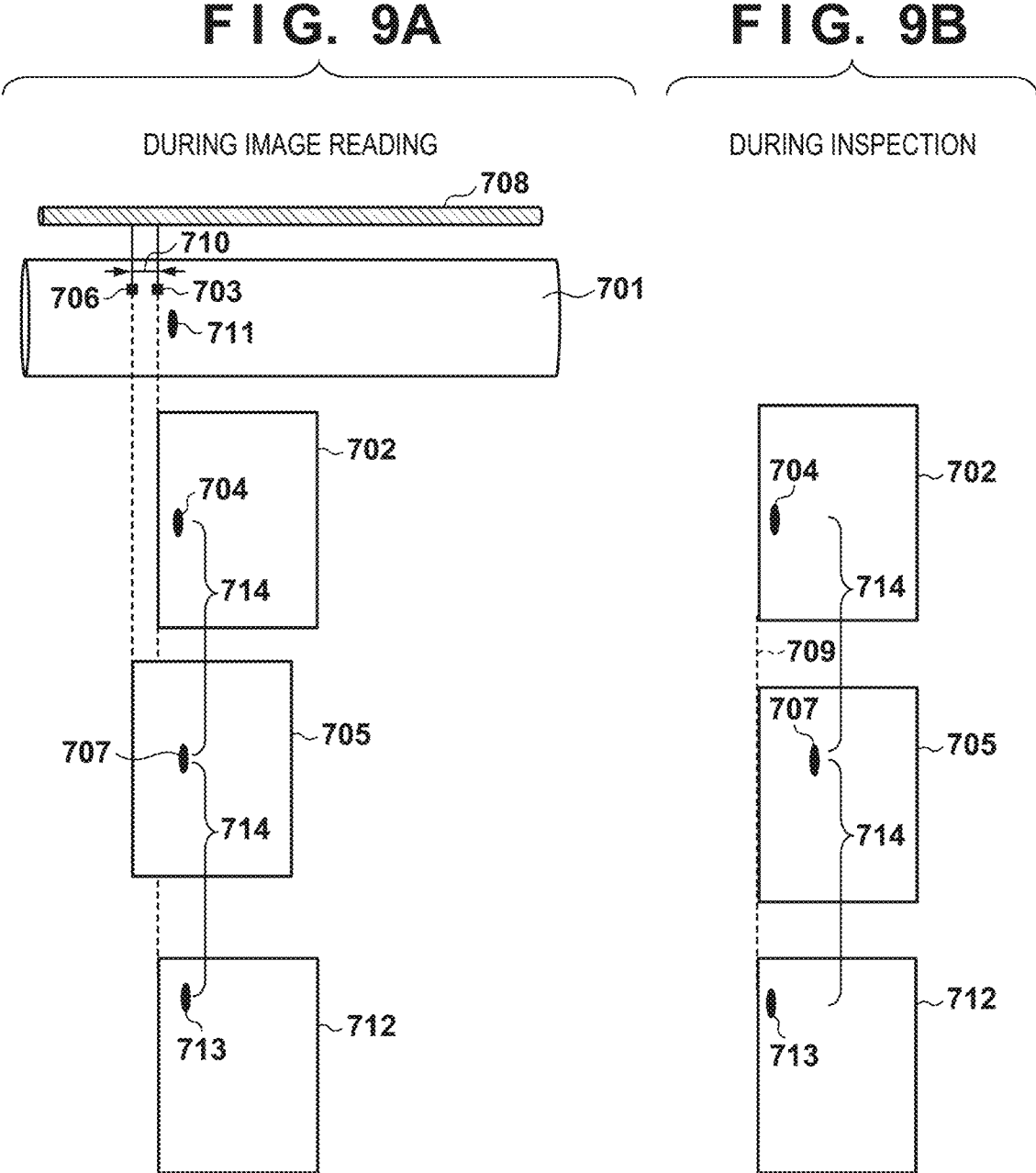

F I G. 10
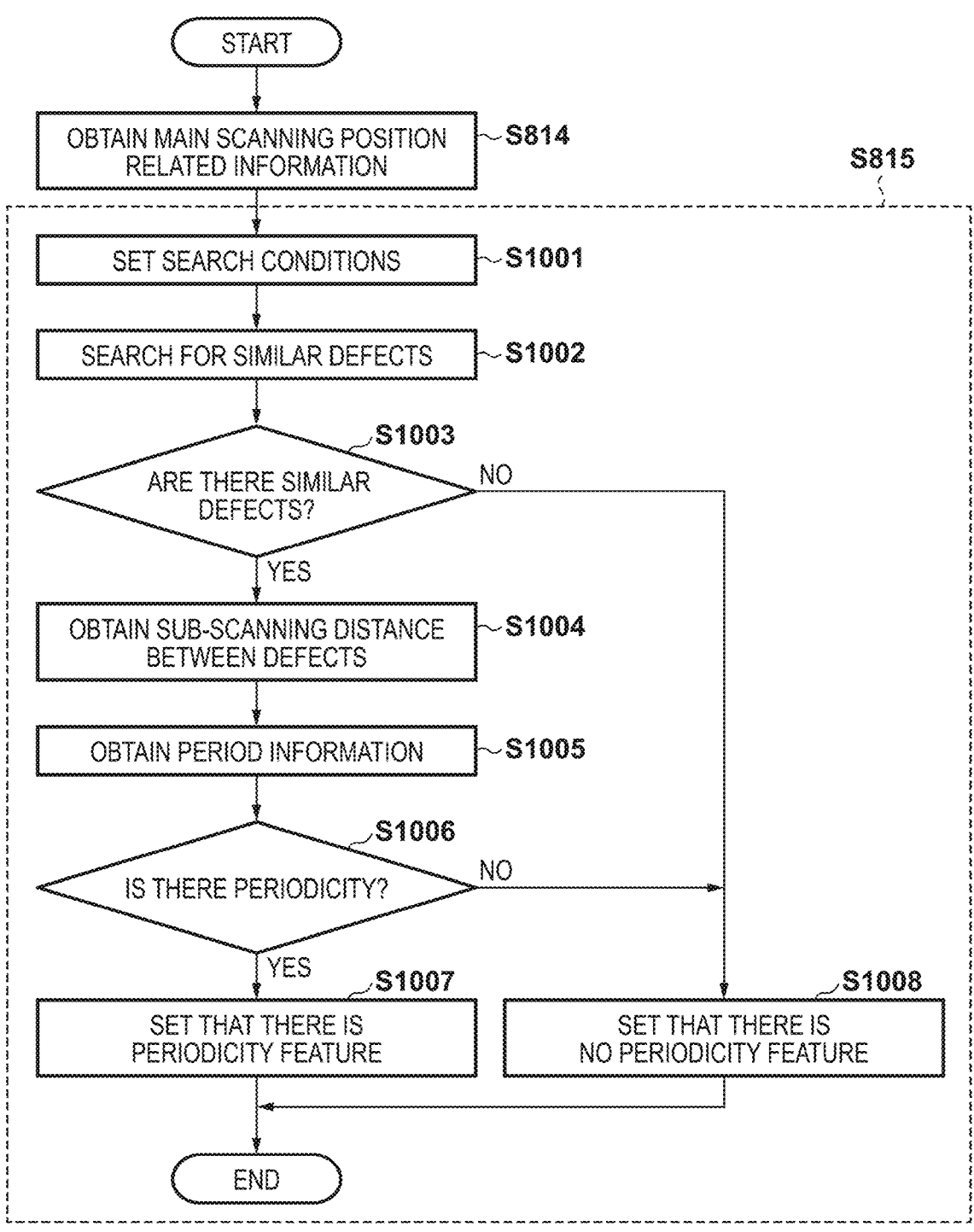

DURING IMAGE READING

DURING INSPECTION

F I G. 13B
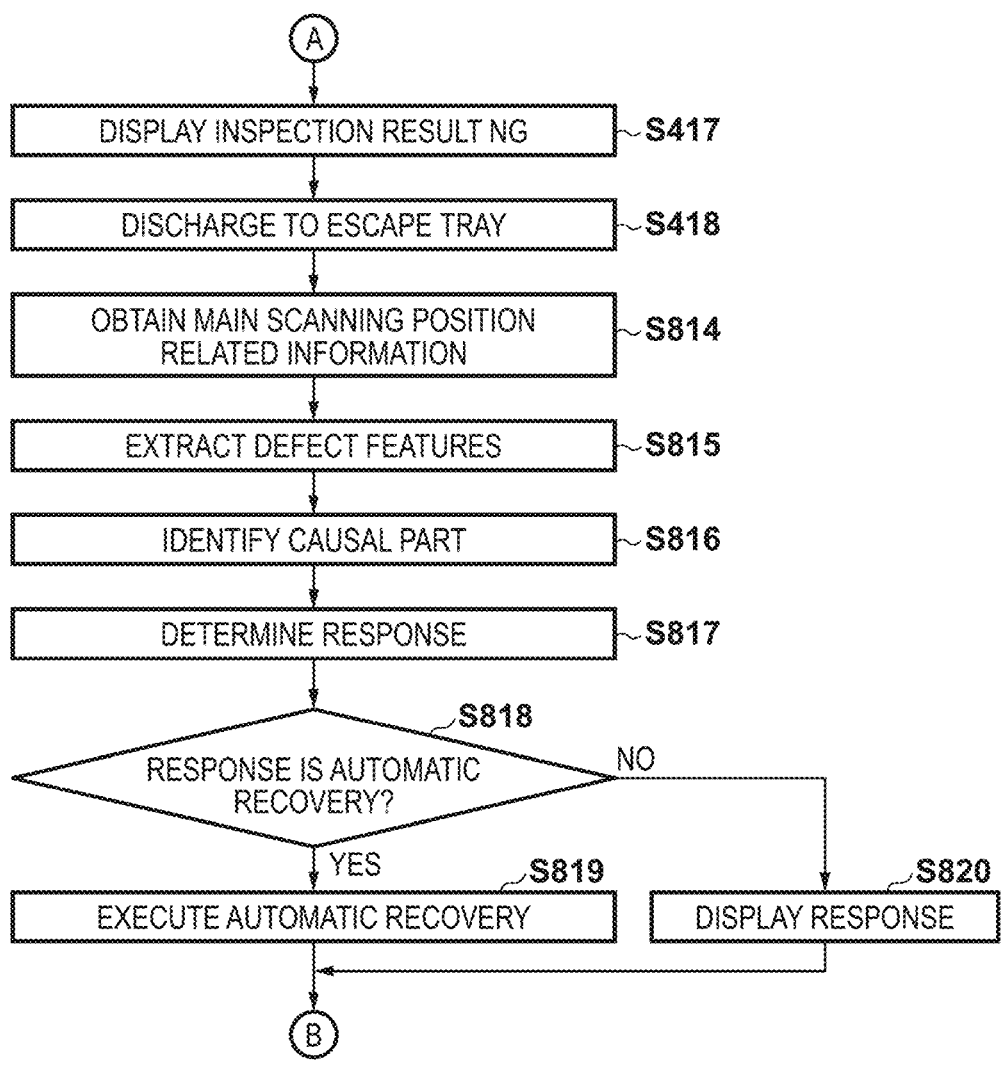

F I G. 14
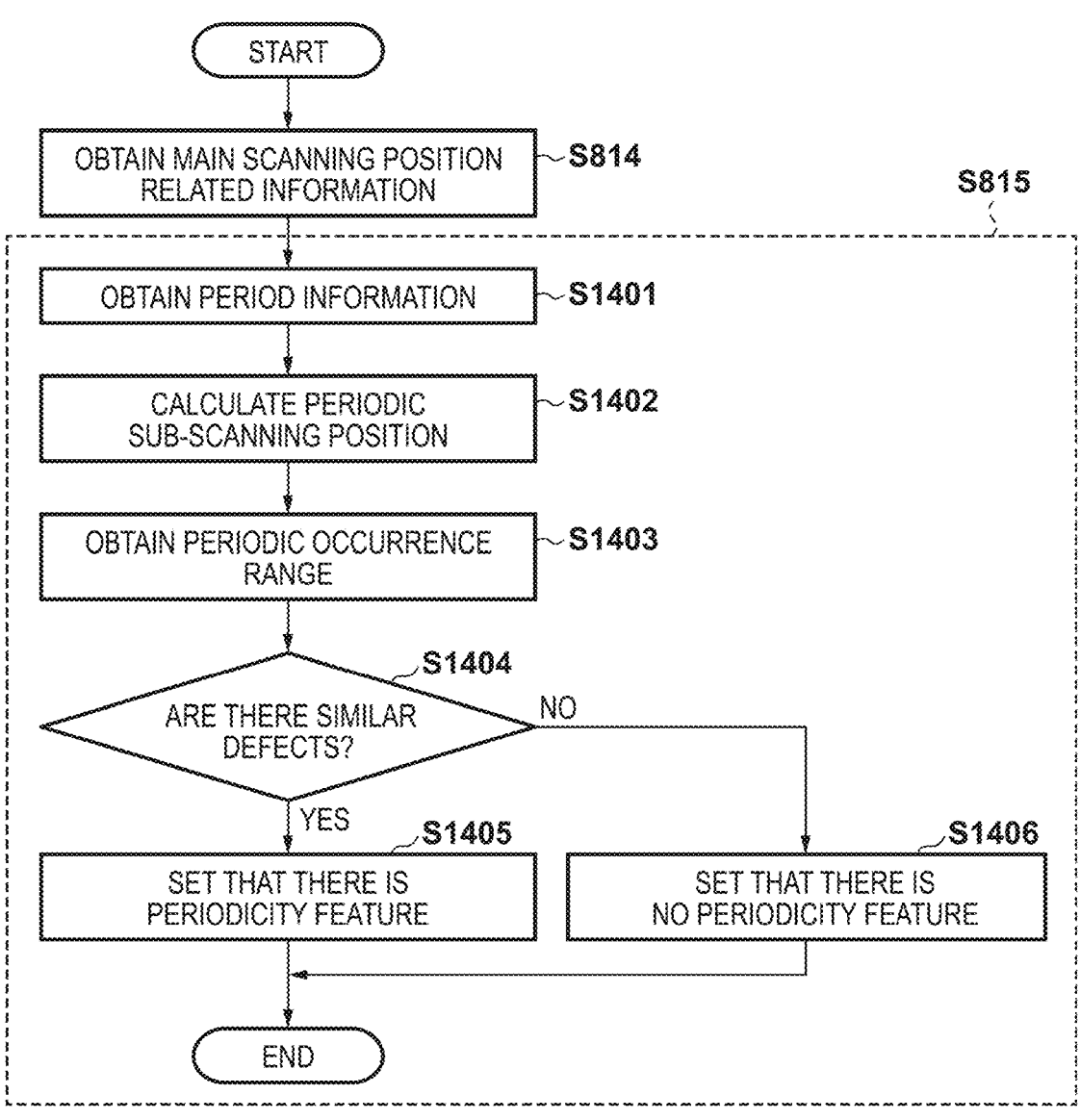

F I G. 15A

DURING IMAGE READING

708

710

701

706 703

711

704 702

707 705

F I G. 15B

DURING INSPECTION

702

704

710

1501

1502

707

1503

1504

705

| PARTS | PERIOD INFORMATION |
|---|---|
| PHOTOSENSITIVE DRUM | 96.1mm |
| DEVELOPING UNIT | 37mm |
| INTERMEDIATE TRANSFER BELT | 1149.4mm |
| . . . | . . . |

F I G. 18A

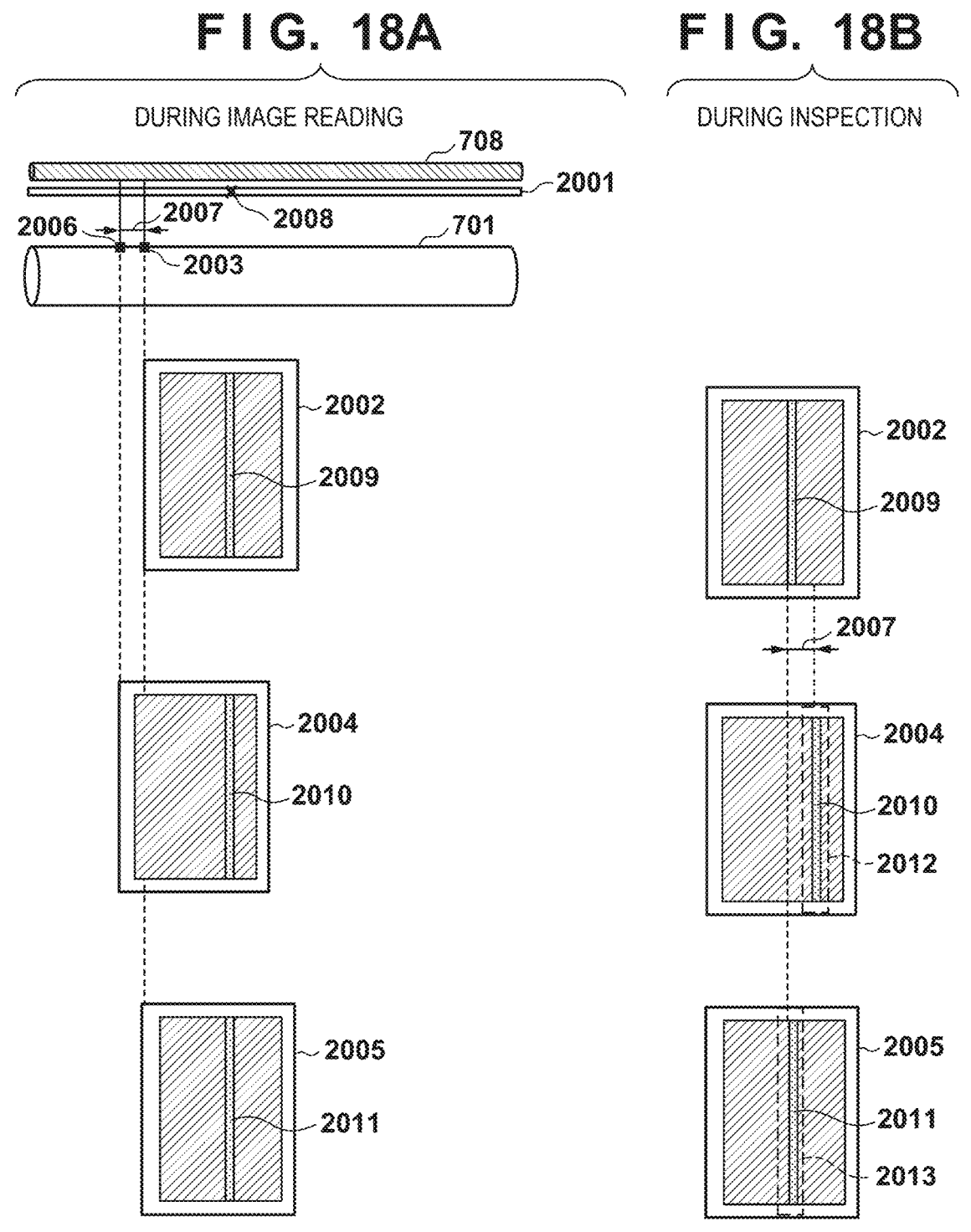

DURING IMAGE READING 708
2001
2006   2007   2008   701
2003
2002
2009
2004
2010
2005
2011

F I G. 18B

DURING INSPECTION 2002
2009
2007
2004
2010
2012
2005
2011
2013

INSPECTION SYSTEM AND METHOD OF CONTROLLING THE SAME, AND STORAGE MEDIUM THAT DETERMINE WHETHER A CONTINUOUS IMAGE DEFECT HAS OCCURRED

BACKGROUND OF THE INVENTION

Cross-Reference to Priority Application

This application claims the benefit of Japanese Patent Application No. 2023-014173, filed Feb. 1, 2023, which is hereby incorporated by reference herein in their entirety.

Field of the Invention

The present invention relates to an inspection system and a method of controlling the same, and a storage medium.

Description of the Related Art

There are techniques for diagnosing a failure of an image forming apparatus. Japanese Patent Laid-Open No. 2011-29794 describes a technique in which feature amounts of an image defect are used to identify a cause of the image defect. According to this technique, if a sheet becomes tilted during conveyance, feature amounts cannot be accurately extract. Therefore, feature amounts are extracted after the tilt of the sheet during conveyance is corrected.

In the failure diagnosis techniques for diagnosing a failure of an image forming apparatus, it is necessary that a cause of an image defect that occurred is reliably identified for a diagnosis to be performed more accurately.

However, aside from a sheet becoming tilted during conveyance, there are cases where feature amounts cannot be accurately extracted. As a measure for preventing damage to an intermediate transfer belt or a fixing unit by paper edges, paper reciprocating control (hereafter, reciprocation) in which a main scanning position through which paper passes with respect to the intermediate transfer belt or the fixing unit is changed is known. When such reciprocating control is executed, a main scanning position through which a sheet passes with respect to a part, such as the intermediate transfer belt or the fixing unit, may shift across pages. When such a shift occurs, the part and the main scanning position of a sheet do not match. Image defects, such as streaks, blotting, and losses, which are attributable to the part, occur at the same main scanning positions. However, during inspection, a read image that is based on the corners of a sheet (recording material) on which the image is printed are used to obtain a main scanning position from the left edge of the image. Therefore, due to the aforementioned shift, a shift occurs in a main scanning position at which an image defect occurred. With such a shift in the main scanning position, image defects that occurred due to the same part may be determined to be unexpected image defects or image defects attributable to different parts. Such erroneous determination could have occurred in the technique of Japanese Patent Laid-Open No. 2011-29794.

SUMMARY OF THE INVENTION

Embodiments of the present disclosure eliminate the above-mentioned issues with conventional technology.

A feature of embodiments of the present disclosure is to provide a technique that allows accurate detection of an image defect in an image and reliable identification of a cause of the image defect.

According to embodiments of the present disclosure, an inspection system comprises a printing apparatus, an inspection apparatus, and one or more controllers including one or more processors and one or more memories, the one or more controllers configured to cause a reading device of the inspection apparatus to read a printed matter for which the printing apparatus has printed an image on a recording sheet to obtain image data of the image, to obtain a shift amount of a recording sheet in a direction orthogonal to a conveyance direction of a recording sheet used by the printing apparatus for printing, to cause the inspection apparatus to detect an image defect included in the image data obtained by the reading device performing reading, and diagnose a failure location of the printing apparatus based on a result of detection by the inspection apparatus, wherein, in the diagnosis, the failure location is diagnosed based on a detection result of an image defect included in a detection target region determined based on the obtained shift amount.

According to embodiments of the present disclosure, a method of controlling an inspection system including a printing apparatus and an inspection apparatus, the method comprises causing a reading device of the inspection apparatus to read a printed matter for which the printing apparatus has printed an image on a recording sheet to obtain image data of the image, obtaining a shift amount of a recording sheet in a direction orthogonal to a conveyance direction of a recording sheet used by the printing apparatus for printing, causing the inspection apparatus to detect an image defect included in the image data obtained by the reading device performing reading, and diagnosing a failure location of the printing apparatus based on a result of detection by the inspection apparatus, wherein, in the diagnosing, the failure location is diagnosed based on a detection result of an image defect included in a detection target region determined based on the obtained shift amount.

Further features of the present disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the disclosure and, together with the description, serve to explain the principles of the disclosure.

FIG. 6 is a flowchart for explaining a print operation to be performed by a printing apparatus and a procedure of image defect inspection processing to be performed by an inspection apparatus according to the embodiments.

FIGS. 7A and 7B are diagrams illustrating examples of filter processing for emphasizing a particular shape.

FIGS. 9A and 9B are diagrams respectively illustrating an example in which an image defect occurring periodically in a sub-scanning direction shifts in a main scanning position across pages during inspection.

FIG. 10 is a flowchart for explaining image defect feature extraction processing of step S815, which follows main scanning position related information obtainment processing of step S814 of FIG. 8 and is to be performed the inspection apparatus according to the first embodiment.

FIGS. 13A and 13B are flowcharts for explaining processing in which an actual image of a user is used to perform image diagnosis processing according to a second variation of the first embodiment.

FIG. 14 is a flowchart for explaining a procedure of periodicity feature extraction processing according to a second embodiment.

FIGS. 15A and 15B are diagrams illustrating an example in which a laser write start position is obtained as main scanning position related information and period information is used to set a periodic occurrence range according to the second embodiment.

FIGS. 18A and 18B are schematic diagrams illustrating continuity feature extraction processing and an example in which a streak-like image defect occurring continuously in the same main scanning position with respect to a part across pages shifts in the main scanning position during inspection according to the third embodiment.

DESCRIPTION OF THE EMBODIMENTS

Figure 1:
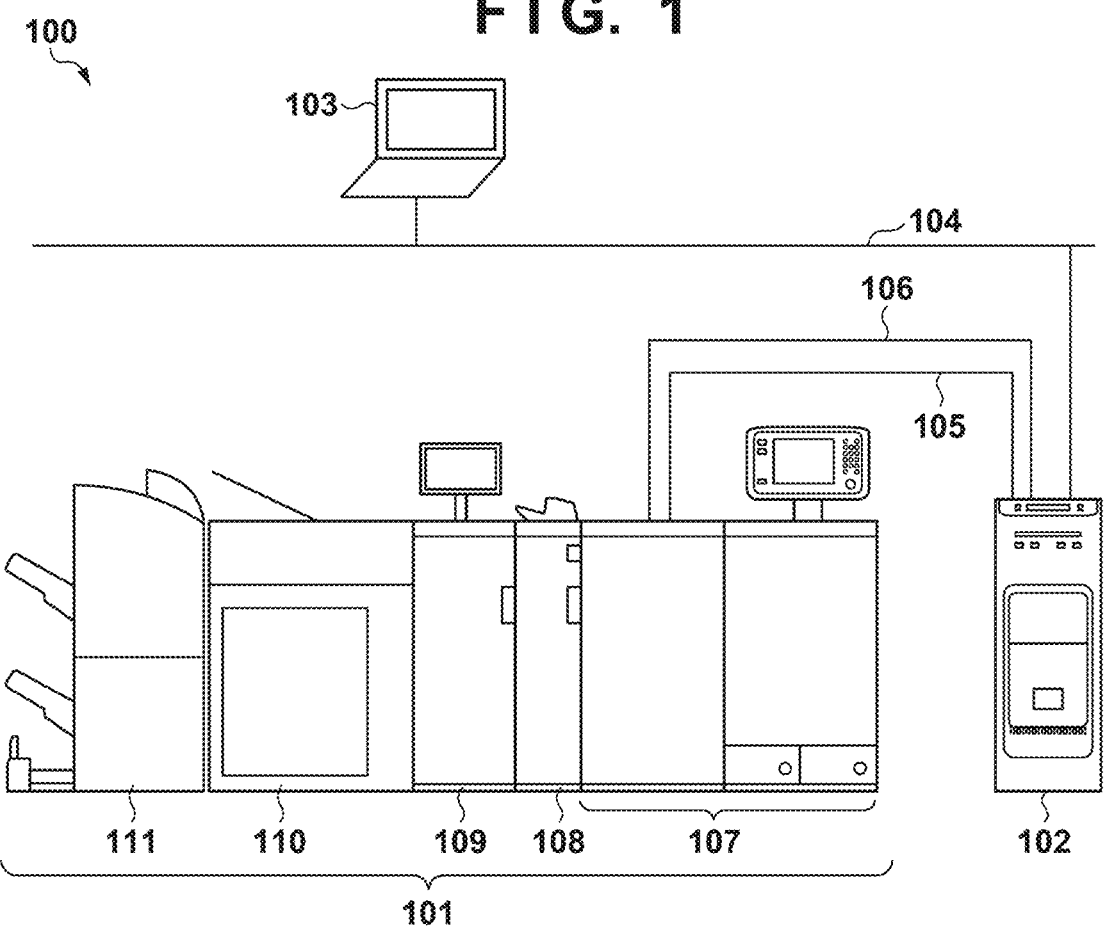
FIG. 1 is a diagram illustrating an example of a network configuration that includes a printing system (image processing system) according to embodiments of the present invention.

Embodiments of the present disclosure will be described hereafter in detail, with reference to the accompanying drawings. It is to be understood that the following embodiments are not intended to limit the claims of the present disclosure, and that not all of the combinations of the aspects that are described according to the following embodiments are necessarily required with respect to the means to solve the issues according to the present disclosure. Further, in the accompanying drawings, the same or similar configurations are assigned the same reference numerals, and redundant descriptions are omitted.

In the following description, an external controller may be referred to as an image processing controller, a digital front end (DFE), a print server, and the like. An image forming apparatus may be referred to as a multi-function peripheral (MFP).

FIG. 1 is a diagram illustrating an example of a network configuration that includes a printing system (image processing system) according to embodiments of the present invention.

A printing system 100 includes an image forming apparatus 101 and an external controller 102. The image forming apparatus 101 and the external controller 102 are connected via an internal LAN 105 and a video cable 106 so as to be capable of communication. The external controller 102 is connected with a client PC 103 via an external LAN 104 so as to be capable of communication.

The client PC 103 can issue print instructions to the external controller 102 via the external LAN 104. A printer driver that has a function of converting print processing target image data into a page description language (PDL) that can be processed by the external controller 102 is installed on the client PC 103. By operating the client PC 103, a user who wants to perform printing can issue a print instruction via the printer driver from various kinds of applications installed on the client PC 103. The printer driver transmits PDL data, which is print data, to the external controller 102 based on the print instruction from the user. Upon receiving the PDL data from the client PC 103, the external controller 102 analyzes and interprets the received PDL data. Then, rasterization processing is performed based on the interpretation result to generate a bitmap image (print image data) whose resolution matches that of the image forming apparatus 101, and a print instruction is issued by input of a print job to the image forming apparatus 101. The resolution of the image to be formed by the image forming apparatus 101 is 600 dpi at normal and 1200 dpi at high definition. Descriptions will be given below using examples in which the resolution is 600 dpi.

Next, the image forming apparatus 101 will be described. In the image forming apparatus 101, a plurality of apparatuses having functions different from each other are connected, and a configuration is taken so as to allow complicated printing processing, such as bookbinding. The image forming apparatus 101 includes devices, such as a printing apparatus 107, an inserter 108, an inspection apparatus 109, a stacker 110, and a finisher 111. Each device will be described below.

The printing apparatus 107 prints an image according to a print job and discharges the printed recording material (sheet). The printed recording material discharged from the printing apparatus 107 is conveyed within each device in the order of the inserter 108, the inspection apparatus 109, the stacker 110, and the finisher 111. In the embodiments, the image forming apparatus 101 of the printing system 100 is an example of the image forming apparatus However, in some cases, the printing apparatus 107 included in the image forming apparatus 101 is referred to as the image forming apparatus.

The printing apparatus 107 uses toner (coloring material) to form (prints) an image on a recording material fed and conveyed from a paper feeding unit disposed in a lower portion of the printing apparatus 107. The inserter 108 is an apparatus for inserting an interleave recording material, or the like, into a series of recording materials conveyed from the printing apparatus 107 to separate them at a desired position, for example. The inspection apparatus 109 is an apparatus for inspecting a printing defect (image image) of a printed recording material conveyed through a conveyance path after an image has been printed by the printing apparatus 107. Specifically, the inspection apparatus 109 reads an image printed on a conveyed printed recording material and compares the obtained read image with a pre-registered reference image to determine whether or not the image printed on the printed recording material is normal, thereby inspecting whether or not there is a print defect. The stacker 110 is an apparatus capable of stacking a large number of printed recording materials. The finisher 111 is an apparatus capable of performing finishing processing, such as stapling processing, punching processing, and saddle stitching processing on conveyed printed recording materials. The recording materials processed by the finisher 111 are discharged to a predetermined discharge tray.

In the configuration example of FIG. 1, the external controller 102 is connected to the image forming apparatus 101. However, the present embodiment is also applicable to a configuration different from this. For example, a configuration may be such that the image forming apparatus 101 is directly connected to the external LAN 104 and print data is transmitted from the client PC 103 to the image forming apparatus 101 without being passed through the external controller 102. In such a case, data analysis and rasterization for print data are performed by the image forming apparatus 101.

Figure 2:
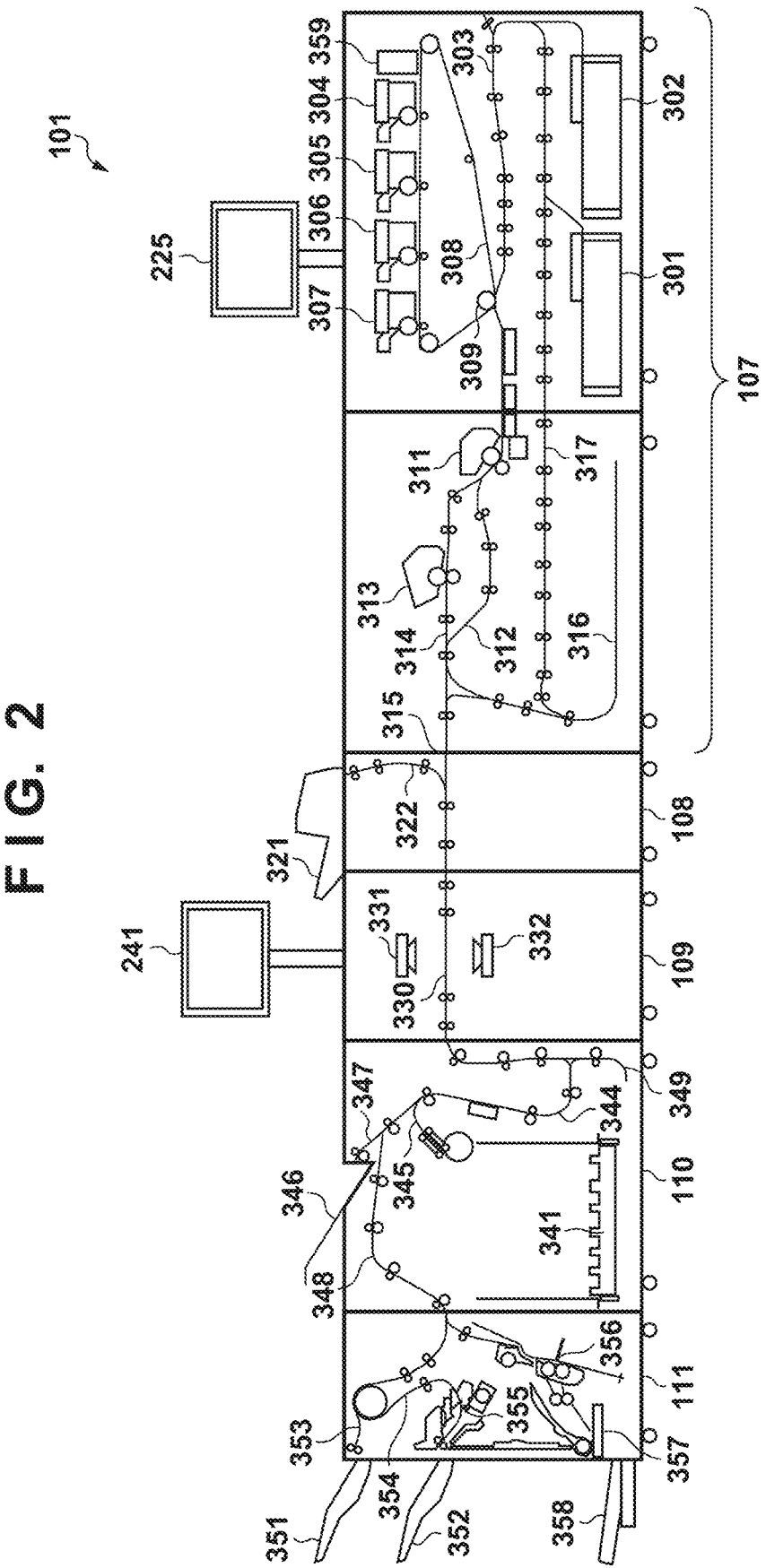
FIG. 2 depicts a cross-sectional view illustrating an example of a hardware configuration of an image forming apparatus according to the embodiments.

FIG. 2 depicts a cross-sectional view illustrating an example of a hardware configuration of the image forming apparatus 101 according to the embodiments. A specific operation example of the image forming apparatus 101 will be described below with reference to FIG. 2.

In the printing apparatus 107, various kinds of recording materials are stored in paper feed decks 301 and 302. Among recording materials stored in a respective paper feed deck, a recording material at the uppermost position is separated and fed to a conveyance path 303 one sheet at a time. Image forming stations 304 to 307 each includes a photosensitive drum (photosensitive body) and each use toner of a different color to form a toner image on the photosensitive drum. Specifically, the image forming stations 304 to 307 form toner images using yellow (Y), magenta (M), cyan (C), and black (K) toners, respectively.

The toner images of respective colors formed in the image forming stations 304 to 307 are sequentially transferred onto an intermediate transfer belt 308 in a superimposed manner (primary transfer). At the intermediate transfer belt 308, a detection sensor 359 for reading a position detection pattern formed for execution of color misregistration correction control is mounted. The detection sensor 359 reads the position detection pattern and the printing apparatus 107 calculates a necessary correction amount based on the read pattern. Color misregistration correction is performed by adjustment of an emission timing of the laser in the image forming stations 304 to 307 based on the correction amount.

Figure 3:
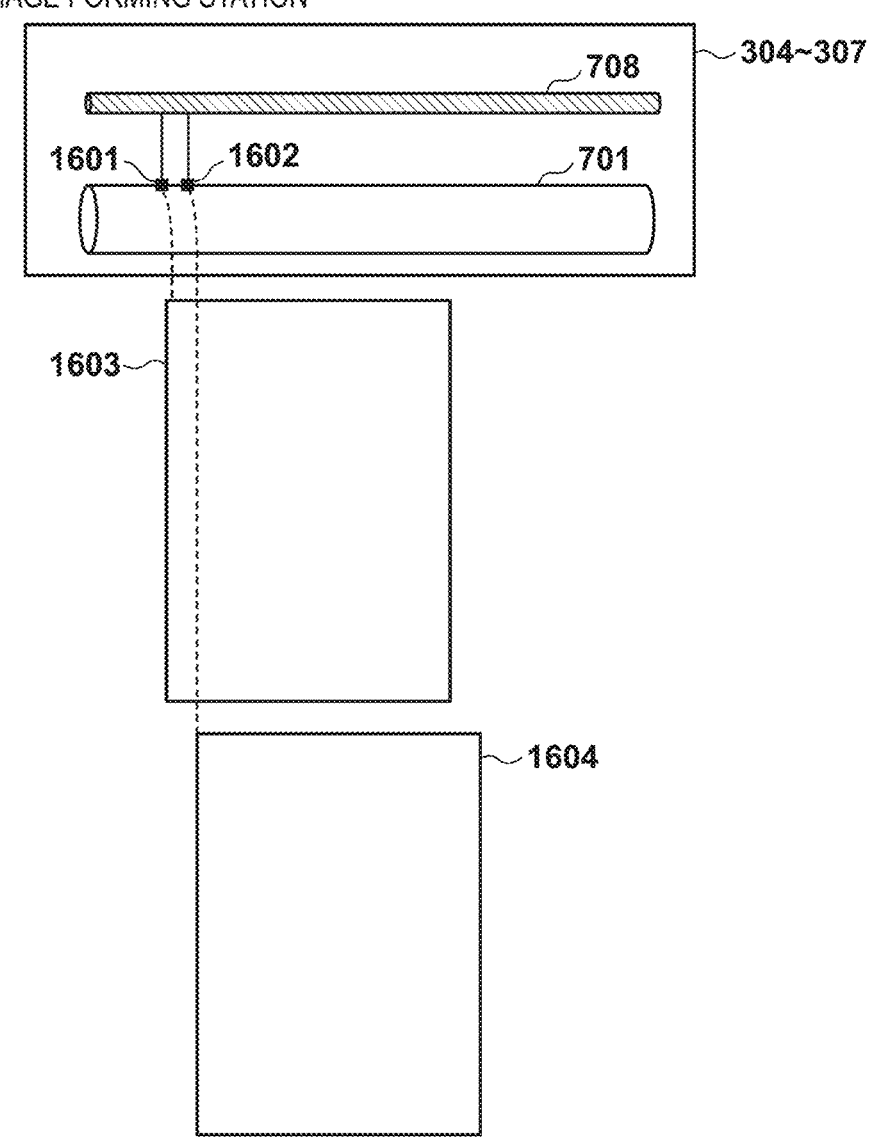
FIG. 3 is a schematic diagram for describing exposure of a photosensitive body to a laser in image forming stations.

FIG. 3 is a schematic diagram for describing laser exposure to the photosensitive body in the image forming stations 304 to 307. A specific operation example for laser exposure in the image forming stations 304 to 307 will be described below with reference to FIG. 3.

A laser 708 adjusts the timing of emission to a photosensitive body 701. When the emission timing is adjusted, a position at which the laser 708 starts writing on the photosensitive body 701 changes. For example, the laser 708 starts writing on the photosensitive body 701 from a position 1601 for a recording material 1603. When the start of the emission timing is delayed, the laser 708 starts writing on the photosensitive body 701 from a position 1602 for a recording material 1604. Due to the above control, even if an image defect is due to the same part (component) (e.g., on the photosensitive body), a shift between the main scanning positions at which the image defects occur on the sheets occurs.

The toner images superimposed and transferred to the intermediate transfer belt 308 are conveyed to a secondary transfer position 309 according to the rotation of the intermediate transfer belt 308. At the secondary transfer position 309, the toner images are transferred from the intermediate transfer belt 308 to a recording material conveyed through the conveyance path 303 (secondary transfer). The transferred recording material is then conveyed to a fixing unit 311. The fixing unit 311 includes a pressing roller and a heating roller. Fixing processing for fixing the toner images on the recording material is performed by application of heat and pressure to the recording material while the recording material is passing between the rollers. Reciprocation is provided for the fixing unit 311 and the intermediate transfer belt 308 as a measure against damage by paper edges. In the reciprocation, the main scanning position through which the recording material passes with respect to the fixing unit 311 and the intermediate transfer belt 308 is changed so as to reduce damage to the fixing unit 311 and the intermediate transfer belt 308 by paper edges. In addition, the write start position of the laser 708 at the image forming stations 304 to 307 is changed according to the reciprocation of the main scanning position of the recording material.

Figure 4:
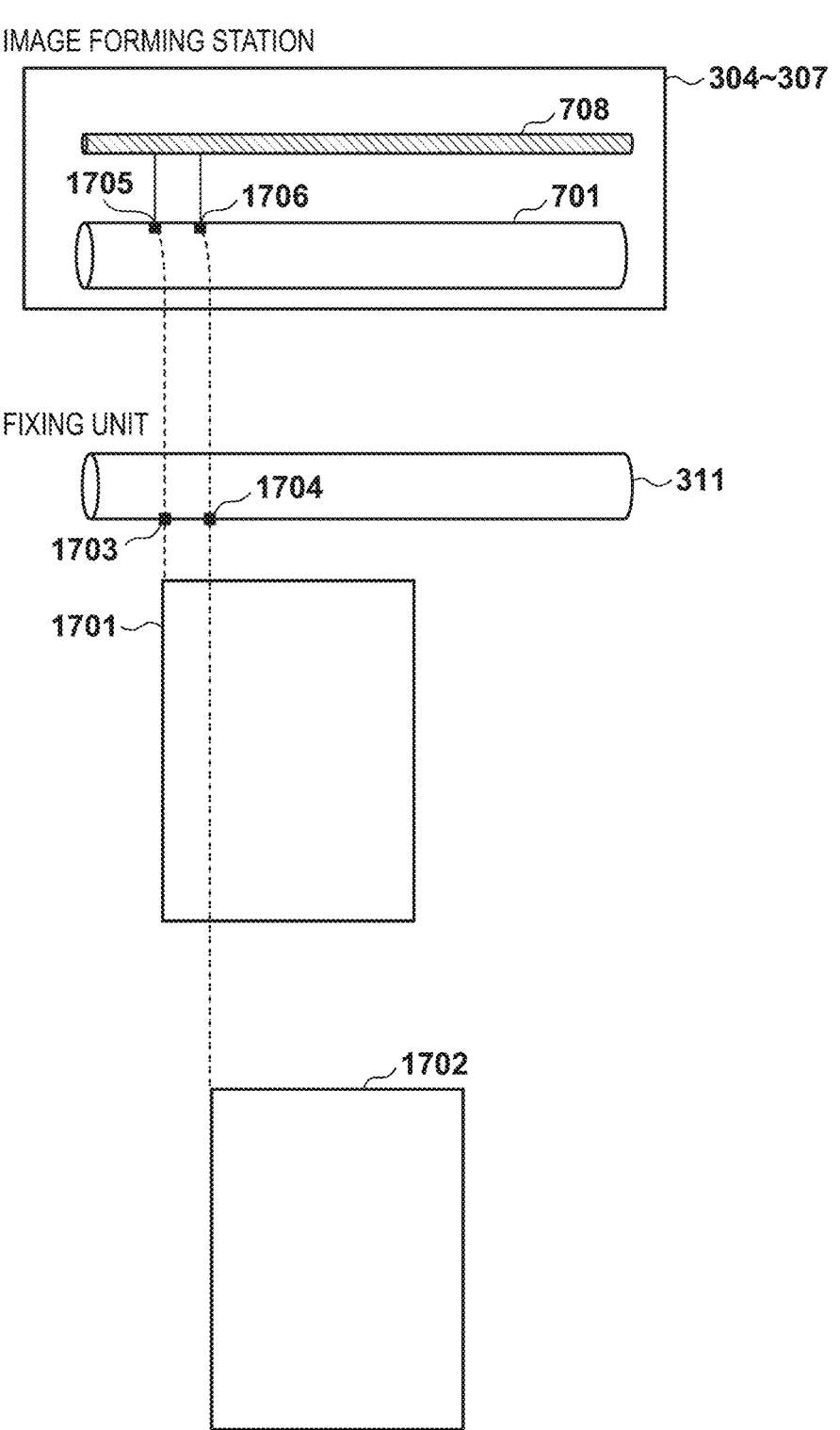
FIG. 4 is a schematic diagram illustrating a relationship between the photosensitive body and the laser in the image forming stations and a fixing unit.

FIG. 4 is a schematic diagram illustrating a relationship between the photosensitive body and the laser in the image forming stations 304 to 307 and the fixing unit 311. A specific operation for the laser write start position in the reciprocation will be described below with reference to FIG. 4.

For example, by reciprocation, the position through which a recording material 1701 passes with respect to the fixing unit 311 is shifted to a position 1703 and the position through which a recording material 1702 passes with respect to the fixing unit 311 is shifted to a position 1704. At this time, the laser 708 starts writing on the photosensitive body 701 from the position 1705 for the recording material 1701 and from the position 1706 for the recording material 1702. Due to the above control, even if an image defect is due to the same part (e.g., on the photosensitive body), a shift occurs in the main scanning position at which the image defect occurs, similar to the color misregistration correction control. The recording material that has passed through the fixing unit 311 is conveyed through a conveyance path 312 to a connection point 315 between the printing apparatus 107 and the inserter. A color image is thus formed (printed) on the recording material.

When further fixing processing is necessary according to the type of the recording material, the recording material that has passed through the fixing unit 311 is guided to a conveyance path 314 in which a fixing unit 313 is disposed. The fixing unit 313 performs further fixing processing on the recording material conveyed through the conveyance path 314. The recording material that has passed through the fixing unit 313 is conveyed to the connection point 315. When the operation mode in which double-sided printing is performed is set, the recording material on which an image has been printed on a first surface and which has been conveyed through the conveyance path 312 or the conveyance path 314 is guided to a reversing path 316. The recording material reversed in the reversing path 316 is guided to a double-sided conveyance path 317 and conveyed to the secondary transfer position 309. The toner images are thus transferred to a second surface opposite to the first surface of the recording material at the secondary transfer position 309. By the recording material then passing through the fixing unit 311 (and the fixing unit 313), formation of the color image on the second surface of the recording material is completed.

The printed recording material for which formation (printing) of an image in the printing apparatus 107 has been completed and which has been conveyed to the connection point 315 is conveyed into the inserter 108. The inserter 108 includes an inserter tray 321 on which recording materials to be inserted are set. The inserter 108 performs processing in which a recording material fed from the inserter tray 321 is inserted into a desired insertion position in a series of printed recording materials conveyed from the printing apparatus 107 and the recording materials are conveyed to the subsequent apparatus (inspection apparatus 109). The printed recording materials that have passed through the inserter 108 are sequentially conveyed to the inspection apparatus 109.

The inspection apparatus 109 includes image readers 331 and 332, each having a contact image sensor (CIS), over and under a conveyance path 330 through which the printed recording materials are conveyed from the inserter 108. The image readers 331 and 332 are disposed at positions facing each other across the conveyance path 330. The image readers 331 and 332 are configured to read the upper surface (first surface) and the lower surface (second surface) of the recording material, respectively. The image readers may be configured by, for example, charge coupled devices (CCDs) or line scan cameras instead of the CISs.

The inspection apparatus 109 performs inspection processing for inspecting an image printed on a printed recording material conveyed through the conveyance path 330. Specifically, the inspection apparatus 109 uses the image readers 331 and 332 to perform reading processing for reading images of the printed recording material at a timing at which the printed recording material being conveyed reaches a predetermined position. Further, the inspection apparatus 109 inspects the image printed on the recording material based on the image obtained by the reading processing. The recording materials that have passed through the inspection apparatus 109 are sequentially conveyed to the stacker 110.

In the present embodiment, the inspection apparatus 109 performs processing for inspecting a printed image defect by comparing a read image obtained by reading an image printed on a printed recording material with a pre-registered reference image. As a method of comparing images in the inspection processing, for example, there are a method of comparing pixel values of each corresponding pixels of the read image and the reference image and a method of comparing positions of objects obtained by edge detection. There also is a method in which character data extraction according to optical character recognition (OCR) is used. The inspection apparatus 109 performs inspection processing for preset inspection items. The inspection items include, for example, a shift in the printing position of an image, color tone of an image, density of an image, streaks or fading occurred in an image, and print dropout.

The stacker 110 includes a stack tray 341 as a tray on which printed recording materials conveyed from the inspection apparatus 109, which is disposed upstream in the conveyance direction of printed recording materials, are stacked. The printed recording materials that have passed through the inspection apparatus 109 are conveyed through a conveyance path 344 in the stacker 110. The printed recording materials conveyed through the conveyance path 344 are stacked on the stack tray 341 by being guided to a conveyance path 345.

The stacker 110 further includes an escape tray 346 as a discharge tray. In the present embodiment, the escape tray 346 is used to discharge printed recording materials determined to have an image defect in the printed image as a result of image defect inspection by the inspection apparatus 109. The printed recording materials conveyed through the conveyance path 344 are conveyed to the escape tray 346 by being guided to a conveyance path 347. The printed recording materials that have been conveyed without being stacked in the stacker 110 and without being discharged to the escape tray 346, are conveyed to the subsequent finisher 111 through a conveyance path 348.

The stacker 110 further includes a reversing unit 349 for reversing the direction of conveyed printed recording materials. The reversing unit 349 is used, for example, to align the orientation of the printed recording material when the material is stacked on the stack tray 341 and outputted from the stacker 110 with the orientation of the recording material when it is inputted to the stacker 110. The reversing operation by the reversing unit 349 is not performed for printed recording materials not stacked in the stacker 110 and conveyed to the finisher 111.

The finisher 111 executes finishing processing specified by the user on printed recording materials conveyed from the inspection apparatus 109, which is disposed upstream in the conveyance direction of printed recording materials. In the present embodiment, the finisher 111 includes finishing functions, such as, for example, a stapling function (one-point or two-point stapling), a punching function (two holes or three holes), and a saddle stitch binding function. The finisher 111 includes two output trays 351 and 352. When the finishing processing by the finisher 111 is not performed, the printed recording materials conveyed to the finisher 111 are discharged to the discharge tray 351 through a conveyance path 353. When the finishing processing, such as the stapling processing, is to be performed by the finisher 111, the printed recording materials conveyed to the finisher 111 are guided to a conveyance path 354. The finisher 111 executes the finishing processing specified by the user on the printed recording materials conveyed through the conveyance path 354 using a processing unit 355 and discharges the printed recording material on which the finishing processing has been executed to the discharge tray 352.

Figure 5:
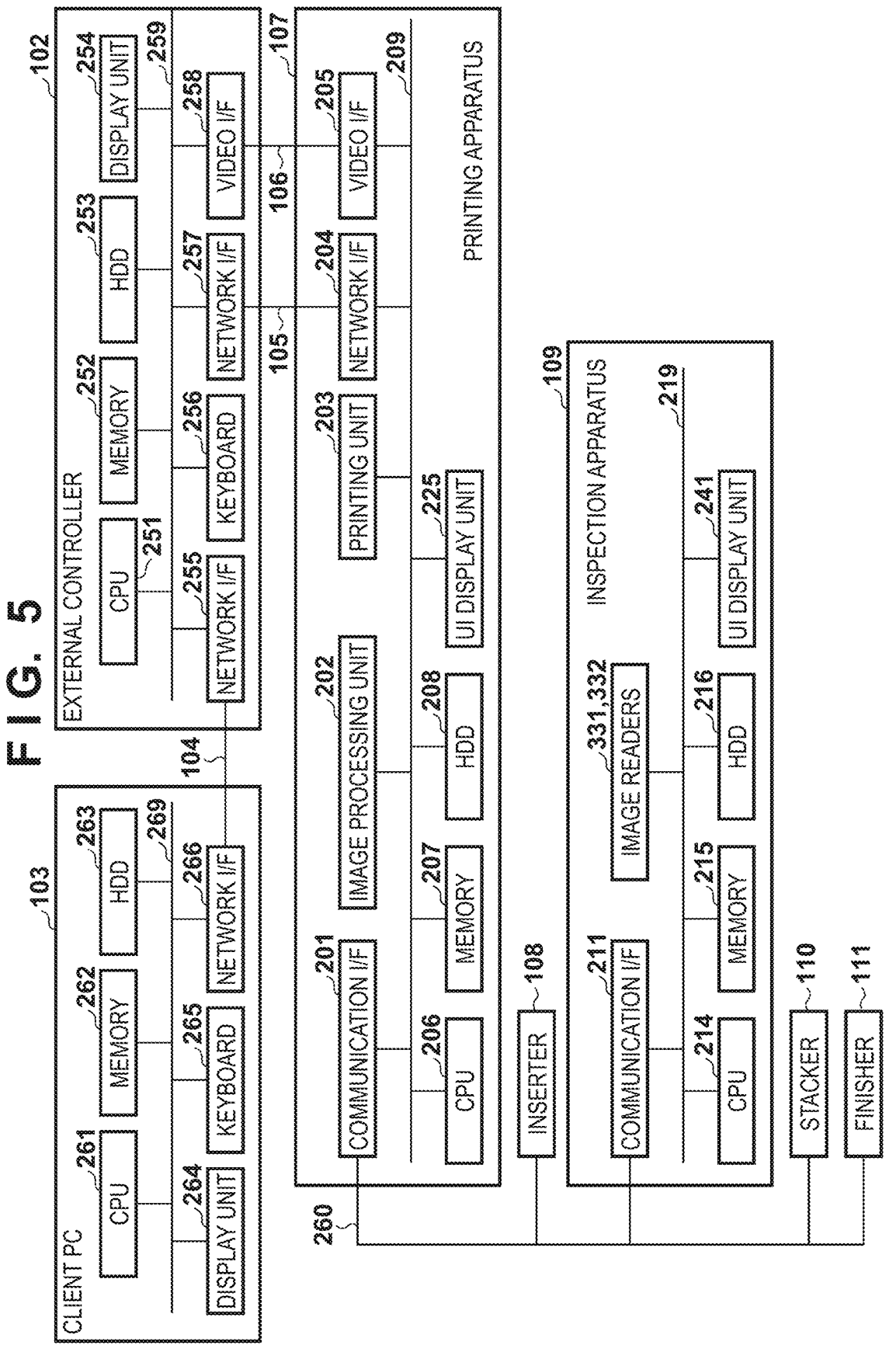
FIG. 5 is a block diagram for describing a schematic configuration of the image forming apparatus, an external controller, and a client PC according to the embodiments.

FIG. 5 is a block diagram for describing a schematic configuration of the image forming apparatus 101, the external controller 102, and the client PC 103 according to the embodiments.

First, the printing apparatus 107 of the image forming apparatus 101 will be described.

The printing apparatus 107 includes a communication I/F (interface) 201, a network I/F 204, a video I/F 205, a CPU 206, a memory 207, an HDD (storage unit) 208, and a UI display unit (operation unit) 225. The printing apparatus 107 further includes an image processing unit 202 and a printing unit (printer engine) 203. These are each connected to be capable of transmitting and receiving data to and from each other via a system bus 209.

The communication I/F 201 is connected to the inserter 108, the inspection apparatus 109, the stacker 110, and the finisher 111 through a communication cable 260. The CPU 206 performs communication for control of each apparatus via the communication I/F 201. The network I/F 204 is connected to the external controller 102 via the internal LAN 105 and is used for communication of control data, and the like. The video I/F 205 is connected to the external controller 102 via the video cable 106 and is used for communication of data, such as image data. The printing apparatus 107 (image forming apparatus 101) and the external controller 102 may be connected only by the video cable 106 as long as the operation of the image forming apparatus 101 can be controlled by the external controller 102.

The HDD 208 stores various kinds of programs or data. The CPU 206 controls the operation of the entire printing apparatus 107 by deploying the programs stored in the HDD 208 in the memory 207 and executing the program. The memory 207 stores programs and data necessary for when the CPU 206 performs various kinds of processing. The memory 207 operates as a work area of the CPU 206. The UI display unit 225 receives input of various kinds of settings and operation instructions from the user and is used to display various kinds of information, such as setting information and print job processing status.

The inserter 108 controls insertion of recording materials fed from the paper feeding unit and conveyance of recording materials conveyed from the printing apparatus 107.

Next, the inspection apparatus 109 of the image forming apparatus 101 will be described.

The inspection apparatus 109 includes a communication I/F 211, a CPU 214, a memory 215, an HDD (storage unit) 216, the image readers 331 and 332, and a UI display unit 241. These devices are connected to be capable of transmitting and receiving data to and from each other via a system bus 219. The communication I/F 211 is connected to the printing apparatus 107 via the communication cable 260. The CPU 214 performs communication necessary for control of the inspection apparatus 109 via the communication I/F 211. The CPU 214 controls the operation of the inspection apparatus 109 by executing a control program stored in the memory 215. The control program for the inspection apparatus 109 is stored in the memory 215.

The image readers 331 and 332 read images of a conveyed recording material according to an instruction of the CPU 214. The CPU 214 performs processing for storing image data obtained by reading images with the image readers 331 and 332 in the HDD 216 as reference images for inspection processing. Further, the CPU 214 compares the images to be inspected read by the image readers 331 and 332 with the reference images stored in the HDD 216 and, based on that comparison result, performs inspection processing for inspecting images printed on the recording materials. Although an example in which image data read by the image readers 331 and 332 is used as the reference images has been described, the present invention is not limited thereto. For example, bitmap image data for which PDL data was rasterized may be stored in the HDD 216 as the reference images and used for image defect inspection processing.

The UI display unit 241 is used to display an image defect inspection result, a setting screen, and the like. An operation unit of the inspection apparatus 109 is also used as the UI display unit 241, is operated by the user, and accepts various instructions from the user, such as a setting change of the inspection apparatus 109, an instruction for registering the reference image, and an instruction for executing image diagnosis, for example. The HDD 216 stores various kinds of setting information necessary for image defect inspection and image data. The various kinds of setting information and image data stored in the HDD 216 can be reused.

The stacker 110 performs control as to whether to discharge a printed recording material conveyed through the conveyance path to the stack tray or the escape tray 346 or to convey the printed recording material to the finisher 111 connected downstream in the conveyance direction.

The finisher 111 controls conveyance and discharge of printed recording materials and performs finishing processing, such as stapling, punching, or saddle stitching on the printed recording materials.

Next, the external controller 102 will be described.

The external controller 102 includes a CPU 251, a memory 252, an HDD 253, a keyboard 256, a display unit 254, network I/Fs 255 and 257, and a video I/F 258. These devices are connected to be capable of transmitting and receiving data to and from each other via a system bus 259. The CPU 251 control the operation of the entire external controller 102, such as reception of print data from the client PC 103, RIP processing, and transmission of print data to the image forming apparatus 101, by deploying a program stored in the HDD 253 in the memory 252 and executing the program. The memory 252 stores programs and data necessary for when the CPU 251 performs various kinds of processing. The memory 252 operates as a work area of the CPU 251.

The HDD 253 stores various kinds of programs and data. The keyboard 256 is used for the user to input operation instructions to the external controller 102. The display unit 254 is, for example, a display and is used to display information on an application being executed in the external controller 102 and an operation screen. The network I/F 255 is connected to the client PC 103 via the external LAN 104 and is used for communication of data, such as print instructions. The network I/F 257 is connected to the image forming apparatus 101 via the internal LAN 105 and is used for communication of data, such as print instructions. The video I/F 258 is connected to the image forming apparatus 101 via the video cable 106 and is used for communication of data, such as image data (print data). Next, the client PC 103 will be described.

The client PC 103 includes a CPU 261, a memory 262, an HDD 263, a display unit 264, a keyboard 265, and a network I/F 266. These devices are connected to be capable of transmitting and receiving data to and from each other via a system bus 269. The CPU 261 controls the operation of each device via the system bus 269 by deploying a program stored in the HDD 263 in the memory 262 and executes the program. Various kinds of processing by the client PC 103 are thus realized. For example, the CPU 261 executes a document processing program stored in the HDD 263 to issue a print data generation and print instruction. The memory 262 stores programs and data necessary for when the CPU 261 performs various kinds of processing. The memory 262 operates as a work area of the CPU 261.

The HDD 263 stores, for example, various kinds of applications (e.g., the document processing program) and programs (e.g., the printer driver) and various kinds of data. The display unit 264 is, for example, a display and is used to display information on an application being executed in the client PC 103 and an operation screen. The keyboard 265 is used for the user to input operation instructions to the client PC 103. The network I/F 266 is connected to the external controller 102 via the external LAN 104 so as to be capable of communication. The CPU 261 communicates with the external controller 102 via the network I/F 266.

In the configuration example of FIG. 1, the external controller 102 is connected to the image forming apparatus 101. However, the present embodiment is also applicable to a configuration different from this. For example, a configuration in which the image forming apparatus 101 is connected to the external LAN 104 and print data is transmitted from the client PC 103 to the image forming apparatus 101 without being passed through the external controller 102 may be used. In such a case, data analysis and interpretation and rasterization for print data are performed by the image forming apparatus 101.

Next, image defect inspection processing according to the present embodiment will be described with reference to FIG. 6.

FIG. 6 is a flowchart for explaining a print operation to be performed by the printing apparatus 107 and a procedure of image defect inspection processing to be performed by the inspection apparatus 109 according to the embodiments. In FIG. 6, the entire flow from a pre-inspection operation until inspection execution is shown. It is assumed that a symbol, "S", in the description of the flowchart represents step. It is similar for the following description of the flowchart. The processing of each step of FIG. 6 is performed by the CPU 206 of the printing apparatus 107 and the CPU 214 of the inspection apparatus 109. In the present embodiment, a setting in which the stacker 110 is set to be the discharge destination of the printed matters (that is, the stack tray 341 of the stacker 110 is set to be the discharge destination) is performed in advance as a print setting.

In step S401, a print operation is started upon acceptance of a print instruction from the client PC 103 or the external controller 102. That is, the print job is started. In the embodiments, in order to simplify the explanation, it is assumed that the PDL data is in a portable document format (PDF) including character images, and the following description will be given using an example in which a direct print instruction for the PDF has been issued to the external controller 102.

Next, the processing proceeds to step S402, and the CPU 251 of the external controller 102 performs PDL interpretation for the font type and size of characters, the designated position of the sheet, and the like, based on descriptions in the PDF file according to a print job of the PDF accepted in step S401. Then, the processing proceeds to step S403, and the CPU 251 performs rasterization into a bitmap according to the resolution setting as interpreted in the PDL interpretation of step S402. Then, the processing proceeds to step S404, and the CPU 251 creates rasterized bit map data as a reference image. Then, the processing proceeds to step S405, and the CPU 251 temporarily stores the reference image created in step S404 in the HDD 253 of the external controller 102. Then, the reference image stored in the HDD 253 is transmitted to the inspection apparatus 109 and stored in the HDD 216 of the inspection apparatus 109. Descriptions will be given below assuming that the resolution of the reference image is 600 dpi.

Next, the processing proceeds to step S406, and the CPU 251 transmits the rasterized bitmap data from the video I/F 258 to the video I/F 205 of the printing apparatus 107 via the video cable 106. Upon receiving the bitmap data, the CPU 206 of the printing apparatus 107 performs printing in the printing unit 203.

Next, the processing proceeds to step S407, the CPU 214 of the inspection apparatus 109 performs processing in which the image readers 331 and 332 read a printed matter printed in step S406. Next, the processing proceeds to step S408, and the CPU 214 stores the read image obtained by the reading in step S407 in the HDD 216 of the inspection apparatus 109 as inspection target image. In the embodiments, descriptions will be given below assuming that the resolution for when the image readers 331 and 332 read the printed matter is 600 dpi.

Next, the processing proceeds to step S409, and the CPU 214 executes filter processing for suppressing occurrence of moiré on the read image of the printed matter obtained by the reading in step S407. This processing is performed to suppress high frequency patterns and leave low frequency components such that interference fringes (moiré) do not occur when resolution conversion is performed. Next, the processing proceeds to step S410, and the CPU 214 performs resolution conversion processing on the filter processed read image of the printed matter. The resolution of the filter processed read image of the printed matter is thus converted into 300 dpi. The resolution into which the conversion is performed is determined based on reference image deformation correction (alignment) of step S412 to be performed later and a computation time for reference image and read image comparison processing of step S413 to be performed later, and the size of an image defect to be detected. Next, the processing proceeds to step S411, and the CPU 214 executes gamma correction on the read image according to a look-up table stored in the memory 215 of the inspection apparatus 109 so as to match the tone of the reference image created in step S404 and the tone of the read image converted in step S410.

Next, the processing proceeds to step S412, and the CPU 214 corrects the deformation of the reference image, and aligns the read image and the reference image for which deformation has been corrected in step S412. Then, the processing proceeds to step S413, and the CPU 214 performs processing for comparing the read image (that is, the inspection target image) with the reference image for which deformation has been corrected in step S412. When the image comparison processing is thus completed, the processing proceeds to step S414, and the CPU 214 determines whether the printed image is normal based on the result of comparison with the reference image according to the comparison processing. This determination is made as follows.

First, filter processing for emphasizing a particular shape is performed on a difference image of the reference image and the read image. The filter processing for emphasizing a particular shape will be described with reference to FIGS. 7A and 7B.

FIGS. 7A and 7B depicts views illustrating examples of filter processing for emphasizing a particular shape. FIG. 7A illustrates an example of a filter for emphasizing a dot-shaped image defect, and FIG. 7B illustrates an example of a filter for emphasizing a line-shaped image defect. The difference image on which these kinds of emphasis processing has been performed is subject to binarization processing in which if a difference value is a numerical value exceeding a threshold, "1" is assumed and if the difference value is a numerical value less than or equal to the threshold, "0" is assumed is performed. Then, in the image on which the binarization processing has been performed, it is determined whether there is a pixel (defective pixels) exceeding the threshold and thus assuming "1". If a determination result that there is no defective pixel is obtained, it is determined to be normal, and if a determination result that that there is a defective pixel is obtained, it is determined to be abnormal (existing image defect). However, the image defect inspection processing (inspection processing) is not limited to the above-described method, and the type thereof is not limited so long as the processing allows the user to detect a desired image defect.

If it is determined in step S414 that the printed image is normal, the CPU 214 proceeds to step S415, and the CPU 214 displays "inspection result OK", which is an image defect inspection result indicating that the printed image is normal, on the UI display unit 241 of the inspection apparatus 109. Then, the processing proceeds step S416, and the CPU 214 instructs the printing apparatus 107 to discharge the printed matter to the stack tray 341 of the stacker 110. The printing apparatus 107 instructs the stacker 110 to discharge the conveyed printed matter to the stack tray 341 based on the instruction from the inspection apparatus 109 and advances the processing to step S419.

Meanwhile, if it is determined in step S414 that the printed image is abnormal (there is an image defect in the image), the processing advances to step S417. In step S417, the CPU 214 displays "inspection result NG", which is an inspection result indicating that the printed image is abnormal, on the UI display unit 241 of the inspection apparatus 109. Then, the processing proceeds to step S418, and the CPU 214 instructs the printing apparatus 107 to discharge the printed matter to the escape tray 346 of the stacker 110. The printing apparatus 107 instructs the stacker 110 to discharge the conveyed printed matter to the escape tray 346 based on the instruction from the inspection apparatus 109 and the processing advances to step S419. In step S419, the CPU 214 determines whether printing and image defect inspection processing of all pages have been completed, and if it is determined that printing and image defect inspection processing of all pages have not been completed, the processing advances to step S403. Then, the CPU 206 of the printing apparatus 107 and the CPU 214 of the inspection apparatus 109 continue the processing of step S403 to step S418. Meanwhile, if it is determined in step S419 that printing and image defect inspection processing of all the pages have been completed, the CPU 214 ends the print processing and the image defect inspection processing. That is, the flow illustrated in FIG. 6 is ended.

First Embodiment

Next, image diagnosis processing according to a first embodiment will be described with reference to FIG. 8.

Figure 8:
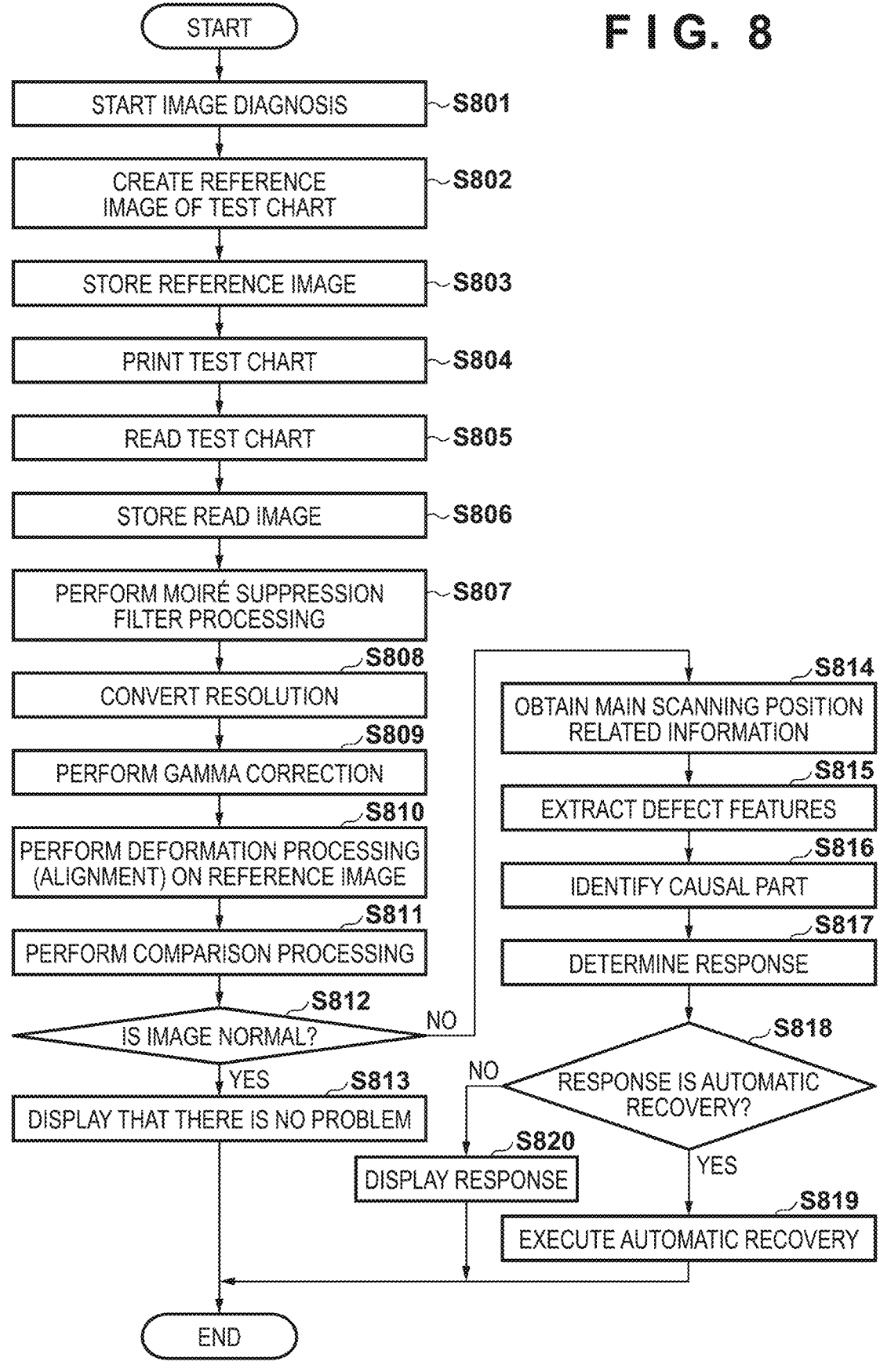
FIG. 8 is a flowchart for explaining a procedure of image diagnosis processing according to a first embodiment.

FIG. 8 is a flowchart for explaining a procedure of image diagnosis processing according to the first embodiment. The processing of each step of FIG. 8 is performed by any one of the CPU 251 of the external controller 102, the CPU 206 of the printing apparatus 107, and the CPU 214 of the inspection apparatus 109.

In step S801, upon accepting an image diagnosis instruction from the user or a service worker via the UI display unit 241 of the inspection apparatus 109, which also serves as the operation unit, the printing system 100 starts the image diagnosis processing. Next, the processing proceeds to step S802, and the CPU 251 of the external controller 102 reads print data of a pre-stored test chart, rasterizes the print data into a bitmap image, and creates a reference image based on the rasterized bitmap data of the test chart. The test chart is an image (hereafter, also referred to as a test image) for failure diagnosis of the image forming apparatus 101. The test chart is of cyan, magenta, yellow, and black solid fills (area ratio 100%). Next, the processing proceeds to step S803, and the CPU 251 temporarily stores the reference image of the test chart created in step S802 in the HDD 253 of the external controller 102. Then, the reference image of the test chart stored in the HDD 253 is transmitted to the inspection apparatus 109 and stored in the HDD 216 of the inspection apparatus 109. Descriptions will be given below assuming that the resolution of the reference image of the test chart at this time is 600 dpi.

Next, the processing proceeds to step S804, and the CPU 251 transmits the rasterized bitmap data of the test chart from the video I/F 258 to the video I/F 205 of the printing apparatus 107 via the video cable 106. Thus, the CPU 206 of the printing apparatus 107 performs halftoning processing on the bitmap data of the test chart received via the video I/F 205 and prints the test chart in the printing unit 203 based on the halftone processed image data.

Next, the processing proceeds to step S805, the CPU 214 of the inspection apparatus 109 performs processing in which the image readers 331 and 332 read the printed test chart. Next, the processing proceeds to step S806, and the CPU 214 stores the read image of the test chart obtained by the reading in step S805 in the HDD 216 of the inspection apparatus 109 as inspection images. In the embodiments, descriptions will be given below assuming that the resolution for when the image readers 331 and 332 read the printed test chart is 600 dpi.

Next, the processing proceeds to step S807, and the CPU 214 executes filter processing for suppressing occurrence of moiré on the read image of the printed matter (test chart) obtained by the reading in step S805. Next, the processing proceeds to step S808, and the CPU 214 performs resolution conversion processing on the filter processed read image of the printed matter (test chart). The resolution of the filter processed read image of the printed matter (test chart) is thus converted into 300 dpi. Next, the processing proceeds to step S809, and the CPU 214 aligns tone of the reference image received from the external controller 102 and stored in the HDD 216 with the tone of the read image for which the resolution has been converted in step S808. Here, gamma correction processing is performed on the read image according to a look-up table stored in the memory 215 of the inspection apparatus 109. Then, the processing proceeds to step S810, and the CPU 214 corrects the deformation of the reference image and aligns the gamma-corrected read image and the reference image for which deformation has been corrected in step S810. Then, the processing proceeds to step S811, and the CPU 214 performs the processing for comparing the reference image and the read image of the test chart for which conditions, such as resolution, have been aligned. When the image comparison processing is thus completed, the processing proceeds to step S812, and the CPU 214 determines whether or not the printed image (test chart image) is normal based on the result of comparison of the reference image and the read image according to the comparison processing, similarly to the inspection procession of step S414 of FIG. 6. Here, if it is determined that the printed image is normal, the processing proceeds to step S813, and the CPU 214 displays the image diagnosis result indicating that there is no problem in the UI display unit 241 of the inspection apparatus 109. For example, "no problem" is displayed.

Meanwhile, if it is determined in step S812 that the printed image is abnormal (there is an image defect in the image), the processing advances the processing to step S814. In step S814, the CPU 214 obtains the main scanning position related information from the printing apparatus 107. The main scanning position related information is described later. Next, in step S815, the CPU 214 extracts feature amounts for an image defect, which is an image portion in which difference data for when the reference image and read image comparison processing has been performed in step S811 is greater than a predetermined amount. Feature amounts of an image defect obtained by the extraction processing includes, for example, color information as to whether it is a single color (yellow, magenta, cyan, or black) or a non-primary color generated by a plurality of colors, contrast information indicating the density of the image defect, and shape information (e.g., size and whether it is vertically long). Further, there are coordinate information indicating the position with respect to the test chart in the printing apparatus 107 and periodicity information indicating that a similar image defect is occurring periodically in a sub-scanning direction of the test chart of the printing apparatus 107. In addition, continuity information indicating that streak-like image defects of the same cause are occurring continuously across pages is one of the feature amounts. Periodicity feature extraction processing for extracting the periodicity information as a feature amount, and continuity feature extraction processing for extracting the continuity information as a feature amount will be described later.

Next, the processing proceeds to step S816, the CPU 214 identifies the part that caused the image defect in the printing apparatus 107 and the inspection apparatus 109 based on the image defect feature amounts obtained in step S815. Next, the processing proceeds to step S817, and the CPU 214 determines a response (countermeasure) to the image defect based on the causal part identified in step S815.

The responses can be divided into responses for which automatic recovery is possible and responses for which automatic recovery is not possible. The responses for which automatic recovery is possible include, for example, responses for which automatic recovery is possible in the printing apparatus 107, such as the cleaning of a wire or a grid of a corona charger, which is a (charge unit) of the photosensitive drum provided in the image forming stations 304 to 307 of the printing apparatus 107. The responses for which automatic recovery is not possible include, for example, responses that need the work of the user, such as cleaning of dirt of reading surfaces surface of image readers 331 and 332 of the inspection apparatus 109 and adjustment of a recording material to be used), and responses that need the work of a service worker, such as exchange of a part. Further, the responses for which automatic recovery is not possible include, for example, responses for fibers, foreign substances, and the like, that are in the recording material from before execution of image formation.

Next, the processing proceeds to step S818, and the CPU 214 determines whether or not the response determined in step S817 is a response for which automatic recovery is possible. If a determination result that the determined response is a response for which automatic recovery is possible is obtained in step S818, the processing advances to step S819. In step S819, the CPU 214 performs automatic recovery control corresponding to the cause of the image defect. Meanwhile, if it is determined in step S818 that the response is not a response for which automatic recovery is possible, the processing advances to step S820. In step S820, the CPU 214 displays the image diagnosis result and the response method on the UI display unit 241 of the inspection apparatus 109. When any of the processes of the above-described step S813, step S819, step S820 is completed, the flowchart (image diagnosis processing) illustrated in FIG. 8 is ended.

[Periodicity Feature Extraction]

Next, the necessity of the periodicity feature extraction processing will be described.

FIGS. 9A and 9B are diagrams illustrating an example in which an image defect occurring periodically in the sub-scanning direction appears as a shift in the main scanning position across pages during inspection.

As illustrated in FIG. 9A, in the printing apparatus 107, the adjustment of the emission timing of the laser 708 in the image forming stations 304 to 307 in the color misregistration correction and the change in the position of the recording material by reciprocation occur. At this time, the write start position of the photosensitive body 701 changes across pages according to the emission timing adjustment of the color misregistration correction or the change in the main scanning position of the recording material by reciprocation. The CPU 206 of the printing apparatus 107 starts writing on the photosensitive body 701 from a write start position 703 for a page 702. Next, the CPU 206 starts writing from a write start position 706 for a page 705. Further, the CPU 206 starts writing from the write start position 703 for a page 712. Image defects 704, 707, and 713 are periodic image defects caused by a damage 711 on the photosensitive body 701. Therefore, as illustrated in FIG. 9A, the image defects 704, 707, and 713 are generated at the same main scanning position with respect to the photosensitive body 701 and is generated every rotation period 714 of the photosensitive body based on the diameter of the photosensitive body 701.

In the page 702 and the page 712, the write start positions are the same with respect to the photosensitive body 701. In this case, the main scanning positions of the image defect 704 and the image defect 713 are the same during inspection. In addition, the color information, size, and contrast information of the defects are similar. Furthermore, the distance between the image defects in the sub-scanning direction coincides with the rotation period 714 of the photosensitive body and thus can be determined to have a periodicity feature of the rotation period 714 of the photosensitive body.

However, in the page 702 and the page 705, the write start position is shifted in the main scanning direction by a shift amount indicated by a reference numeral 710 of FIG. 9A. During inspection, the CPU 214 of the inspection apparatus 109 performs inspection by aligning the left end portions of the read images of the page 702 and the page 705 with a position 709 as illustrated in FIG. 9B. Therefore, in the state during inspection, the main scanning positions of the image defect 704 of the page 702 and the image defect 707 of the page 705 are shifted by the shift amount indicated by the reference numeral 710, and so, it is difficult to determine a sub-scanning periodicity.

Therefore, in the first embodiment, it is made possible to accurately perform periodicity determination by obtaining information related to an image forming position even if the main scanning positions of image defects occurring at the same main scanning positions are shifted during inspection. Main scanning position related information obtainment processing and sub-scanning periodicity feature extraction processing will be described in detail below.

FIG. 10 is a flowchart for explaining image defect feature extraction processing of step S815, which follows main scanning position related information obtainment processing of step S814 of FIG. 8 and is to be performed by the inspection apparatus 109 according to the first embodiment. The purpose of the periodicity feature extraction processing is to extract periodic occurrence of image defects in the sub-scanning direction as an image defect feature amount. As the main scanning position related information, for example, there are the laser write start position and a reciprocation width setting value. In the present embodiment, the laser write start position will be described as an example.

Figures 11A, 11B:
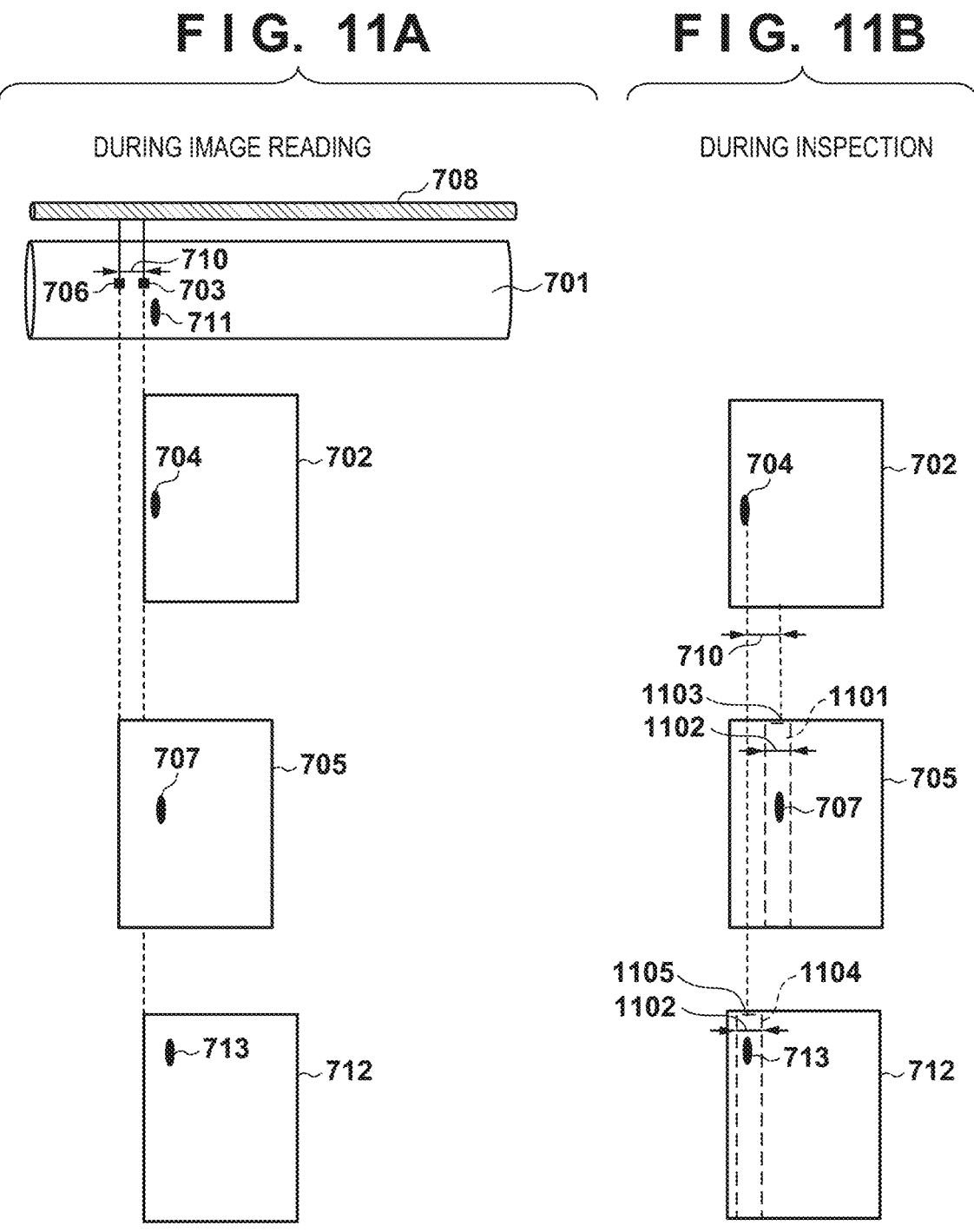
FIGS. 11A and 11B are diagrams illustrating an example in which a laser write start position is obtained and search conditions are set.

FIGS. 11A and 11B are diagrams illustrating an example in which the laser write start position is obtained and search conditions are set.

In step S814, the CPU 214 of the inspection apparatus 109 obtains, as the main scanning position related information of the respective pages, laser write start position information, which starts on the photosensitive body 701 and is control information of the laser 708. In the example of FIGS. 11A and 11B, the CPU 214 obtains the write start position 703 as the main scanning position related information for the page 702. Then, the CPU 214 obtains the write start position 706 as the main scanning position related information for the page 705 and obtains the write start position 703 as the main scanning position related information for the page 712.

Next, the processing proceeds to step S1001, and the CPU 214 sets search conditions 1101 for the page 705 and search conditions 1104 for the page 712 from the main scanning position related information and the position information of the image defect 704 of the page 702. These search conditions are a width (range) in the main scanning direction in which the search is performed and the center coordinates of the width. As a width 1102 of the search conditions 1101 and 1104, for example, a fixed value that takes into account a shift in paper conveyance or a variable value that takes a shift in paper conveyance into account and a size of the image defect 704 in the main scanning direction is set. The center coordinates are calculated by the following flow using the main scanning position related information. The shift amount 710 is calculated by comparing the laser write start position 703 of the page 702 with the laser write start position 706 of the page 705. The center coordinates of the search conditions 1101 are a position 1103, which has been shifted by the shift amount 710 from the main scanning position of the image defect 704 of the page 702. The center coordinates of the search conditions 1104 are set to be a position 1105 based on the main scanning position of the image defect 704 because the write start positions of the page 702 and the page 712 are both the write start position 703 and there is no shift.

Next, the processing proceeds to step S1002, the CPU 214 classifies the image defects present in the search conditions 1101 and 1104 and determines whether there are similar image defects. In the embodiments, the color information, the contrast information, and the size information of the image defects are calculated, and similar image defects are determined. Regarding color information, whether the color is cyan, magenta, yellow, or black is obtained from the reference image. If the color information of the obtained image defects does not match with each other, the image defects are not similar to each other. When the color information of the image defects match, if the image defects are cyan, the contrast is calculated from the value of an R signal, which is the complementary color. If the image defects are magenta, the contrast is obtained from a G signal; if yellow, a B signal, and if black, a luminance signal. In addition, an average value of signals of an image defect is obtained as contrast information of the image defect. The contrast information of image defects is compared with each other, and if the difference is greater than a threshold, the image defects are not similar to each other. The threshold is determined, taking the density variation of the printing apparatus 107 into account. Next, the size of the image defect will be described. The width, height, and area are obtained as defect size information. When the size information of the image defects are compared with each other and the difference is less than or equal to the threshold, the image defects are similar to each other, and when the difference is greater than the threshold, the image defects are not similar. Regarding the threshold, image defects of the same cause are collected in advance and the threshold that can determined that the causes of the image defects are the same is determined using known machine learning.

The method of determining the threshold for the contrast information and the size information is not limited to the above example. The method need only be able to determine the similarity among the image defects, and, for example, a configuration may be taken so as to collect and to analyze in advance image defects of the same cause and to determine the similarity. When the color information matches but the difference in the contrast information and the size information is less than or equal to the threshold, the image defects are assumed to be similar to each other. The method of determining similarity among image defects is not limited to the above example. The method need only be able to determine whether the image defects have features similar to each other, and for example, an integrated similarity may be determined based on color and shape using a known template matching method.

Next, the processing proceeds to step S1003, and the CPU 214 determines whether there are similar image defects, and if it is determined that there are similar image defects, the processing proceeds to step S1004, and the CPU 214 obtains a sub-scanning distance between the image defects and the processing proceeds to step S1005. Meanwhile, if it is determined in step S1003 that there are no similar image defects, the processing advances to step S1008. In step S1005, the CPU 214 obtains period information (a sub-scanning period length) of the part that is held in advance.

Figure 16:
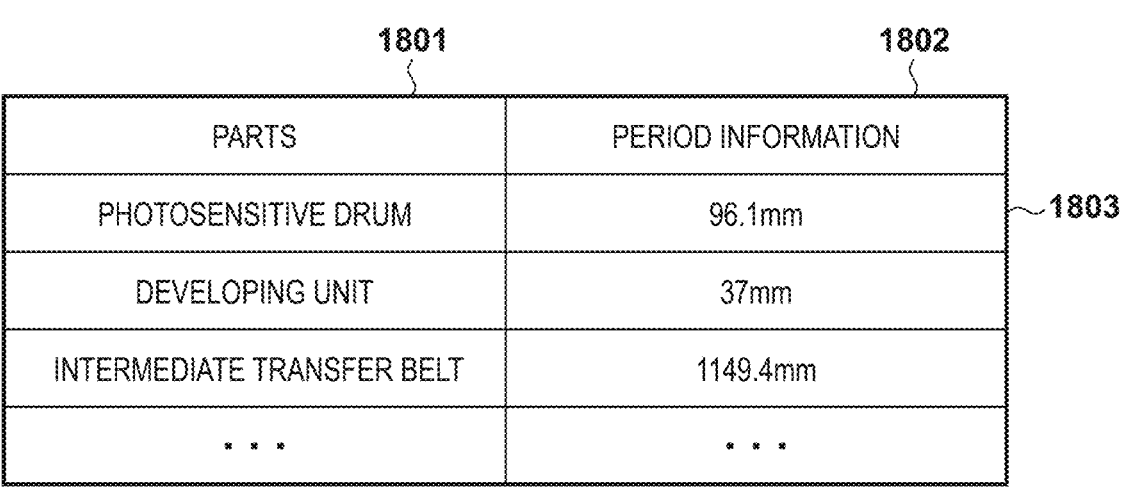
FIG. 16 is a diagram illustrating an example of a relationship between a part of the printing apparatus and their period information.

FIG. 16 is a diagram illustrating an example of a relationship between each part of the printing apparatus 107 and its period information.

In the embodiments, the period information 1802 of the part is information of a sub-scanning period at which image defects attributable to a respective part 1801 occur. A configuration may be taken so as to hold in advance information with which a sub-scanning period distance at which image defects occur can be calculated for the part, such as a difference in speed from paper conveyance speed and the diameter of a respective part, and to calculate the period information by sequential calculation.

Next, the processing proceeds to step S1006, and the CPU 214 compares the calculated sub-scanning distance between image defects and the period information 1802, and if there is matching period information, the processing proceeds to step S1007, and the CPU 214 extracts as a feature amount that the image defects occur at periods corresponding to that of the part and ends the processing. For example, when the sub-scanning distance between the image defects coincide with the period information of the photosensitive drum of FIG. 16, it is extracted as a feature amount that the image defects occur at periods 1803 of the photosensitive drum. The method of determining periodicity is not limited to the above example. For example, in some cases, a sheet-to-sheet interval, which is an interval at which recording materials are conveyed (an interval between the trailing edge of a recording material and the leading edge of the next recording material), is not constant. In such cases, a configuration may be taken so as to obtain sheet-to-sheet interval information for each page and determine periodicity taking the sheet-to-sheet interval information into account. A configuration may also be taken so as to hold a maximum sheet-to-sheet interval and, if the difference between the sub-scanning distance between image defects and the part period information 1802 is within a range, to determine that there is periodicity.

Meanwhile, if it is determined in step S1006 that the sub-scanning distance does not correspond to the period information of any part, the processing advances to step S1008. In step S1008, the CPU 214 extracts as a feature amount that the image defects do not occur periodically and ends the processing. When the processing of either the above-described step S1007 or step S1008 is thus completed, the flowchart illustrated in step S815 (defect feature extraction) of FIG. 10 is ended.

[First Variation]

In the above-described first embodiment, an example in which the laser write start position is used as the main scanning position related information has been described. However, the main scanning position related information is not limited to the above example. For example, the reciprocation width (setting value for the main scanning position through which the recording medium passes) may be used as the main scanning position related information.

Figures 12A, 12B:
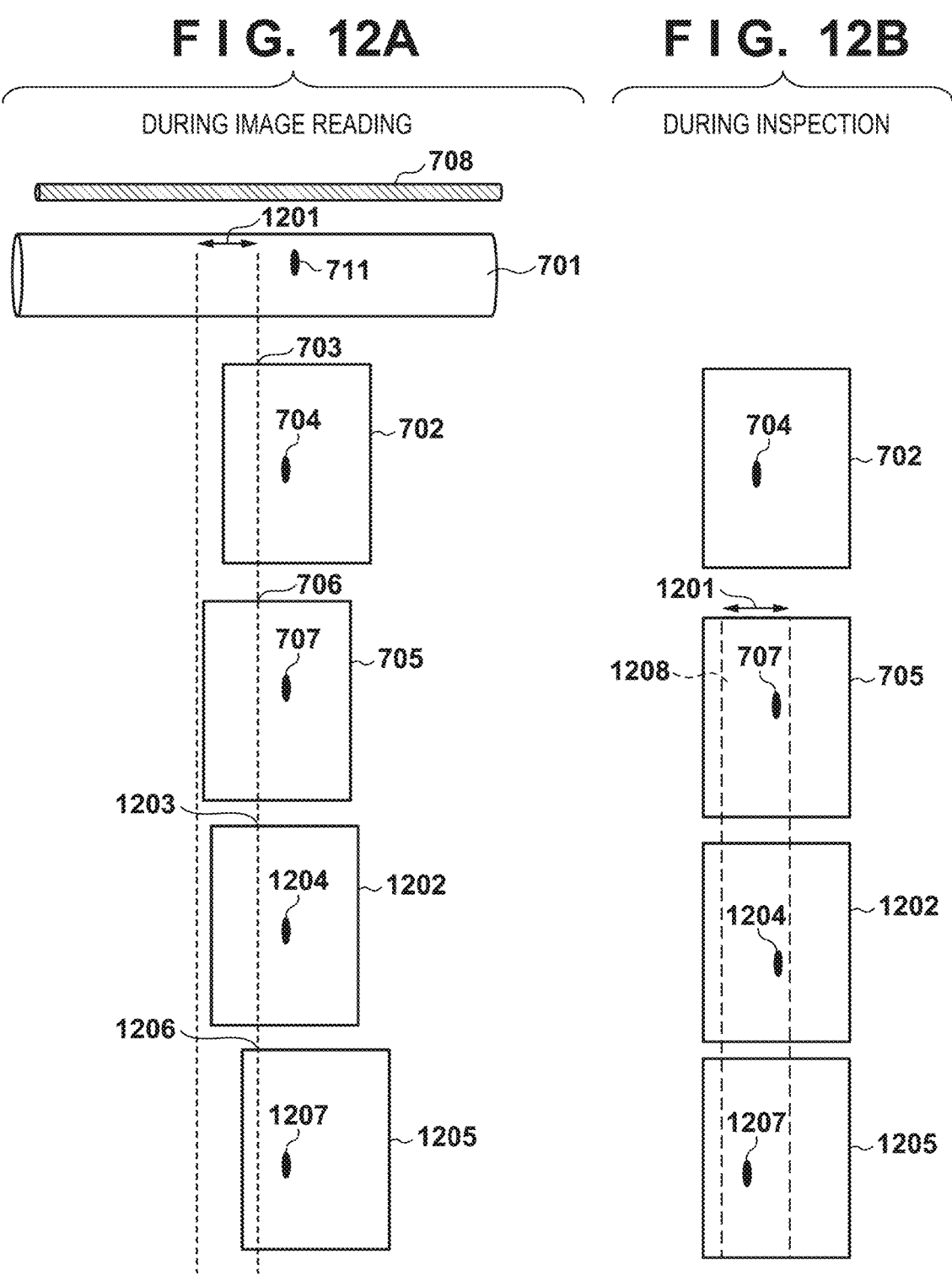
FIGS. 12A and 12B are diagrams illustrating a shift of sheets by reciprocation according to a first variation of the first embodiment.

FIGS. 12A and 12B are diagrams illustrating a shift of sheets by reciprocation according to a first variation of the first embodiment.

In the printing system 100, a reciprocation width 1201 is set for the fixing unit 311 by the user or a service worker via the UI display unit 241, which also serves as an operation unit. By reciprocation, the CPU 206 changes laser write start positions 703, 706, 1203, and 1206 of the photosensitive body 701 for the pages 702, 705, 1202, and 1205 within the range of the reciprocation width 1201.

A case when the reciprocation width is obtained (step S814) as main scanning position related information and the search condition is set (step S1001) will be described in detail.

In step S814, the CPU 214 obtains the reciprocation setting range 1201 as the main scanning position related information. Next, in step S1001, the CPU 214 sets the search conditions 1208 in the pages 705, 1202, and 1205 illustrated in FIG. 12B based on the main scanning position of the image defect 704 and the reciprocation setting range 1201 (main scanning position related information). The center coordinates of the search conditions 1208 is the main scanning position of the image defect 704. The width of the search conditions 1208 is set to the reciprocation setting width 1201 (main scanning position related information). Then, the processing proceeds to step S1002, and the CPU 214 determines whether there are similar image defects in the search conditions 1208.

[Second Variation]

In the above-described first embodiment, an example in which a test chart is used for determination of an image defect has been described. However, the inspection target image to be the image defect determination target is not limited to the example above. For example, a configuration may be taken so as to determine the image defect using an image that the user wishes to output (actual image of the user) and to perform the image diagnosis processing using the determined defect inspection result.

Figure 13A:
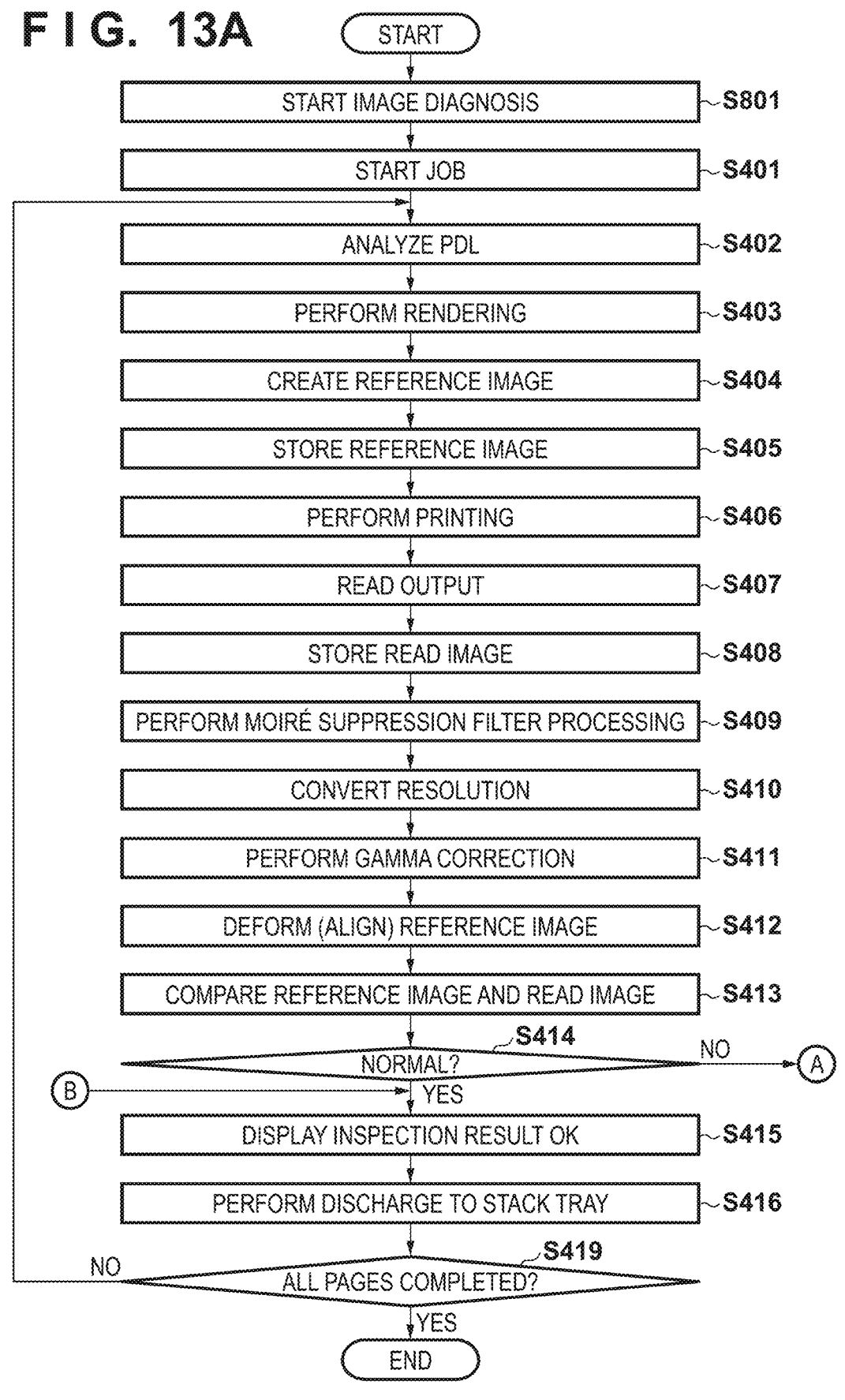

FIGS. 13A and 13B are flowcharts for explaining processing in which an actual image of a user is used to perform image diagnosis processing according to a second variation of the first embodiment. In FIGS. 13A and 13B, the processing that is the same as in the flowcharts of FIGS. 6 and 8 described above is assigned the same reference numeral, and a description thereof will be omitted.

In step S801, upon accepting an image diagnosis instruction from the user or a service worker via the UI display unit 241 of the inspection apparatus 109, which also serves as the operation unit, the printing system 100 starts the image diagnosis processing. Then, the CPU 206 of the printing apparatus 107 and the CPU 214 of the inspection apparatus 109 perform the image defect inspection processing in step S402 to step S414. If it is determined in the image defect inspection processing that the image is abnormal, steps S417 and S418 are executed. Then, the processing proceeds to step S815, and the CPU 214 extracts the defect feature for the detected image defect.

The user or the service worker can select a test chart for specifying a defective portion or any user image as the inspection target image via the UI display unit 241.

As described above, according to the first embodiment, by determining the periodicity of the image defect using the information on the image forming position in the printing apparatus, the periodicity of the image defect can be accurately determined taking the shift in the position of the image defect in the main scanning direction between when image formation is performed and when inspection is performed into account. This makes it possible to accurately identify the part of the printing apparatus that has caused the image defect and, by implementing a response measure based on the identification result, quickly recover the operation of the printing system. Further, by executing the above-described inspection processing at a timing before the user starts printing, it is possible to reliably find the image defect and to ensure that the printing system does not have problems before starting printing.

Second Embodiment

Next, the printing system according to a second embodiment will be described. In the above-described first embodiment, periodicity feature extraction processing in which the main scanning position related information is obtained, search conditions are set, and it is determined whether there are similar image defects has been described. In contrast to this, in the second embodiment, a form in which, in the periodicity feature extraction processing, it is determined whether there are similar image defects based on period information of each part will be described. Since the configuration of the printing system according to the second embodiment is similar to that of the above-described first embodiment, the description thereof will be omitted.

[Periodicity Feature Extraction]

The periodicity feature extraction processing according to the second embodiment will be described with reference to FIG. 14.

FIG. 14 is a flowchart for explaining a procedure of periodicity feature extraction processing according to the second embodiment. FIG. 14 is a flowchart for explaining image defect feature extraction processing of step S815, which follows main scanning position related information obtainment processing of step S814 of FIG. 8 and to be performed the inspection apparatus 109 according to the first embodiment, similarly to the above-described FIG. 10.

Figures 15A, 15B:
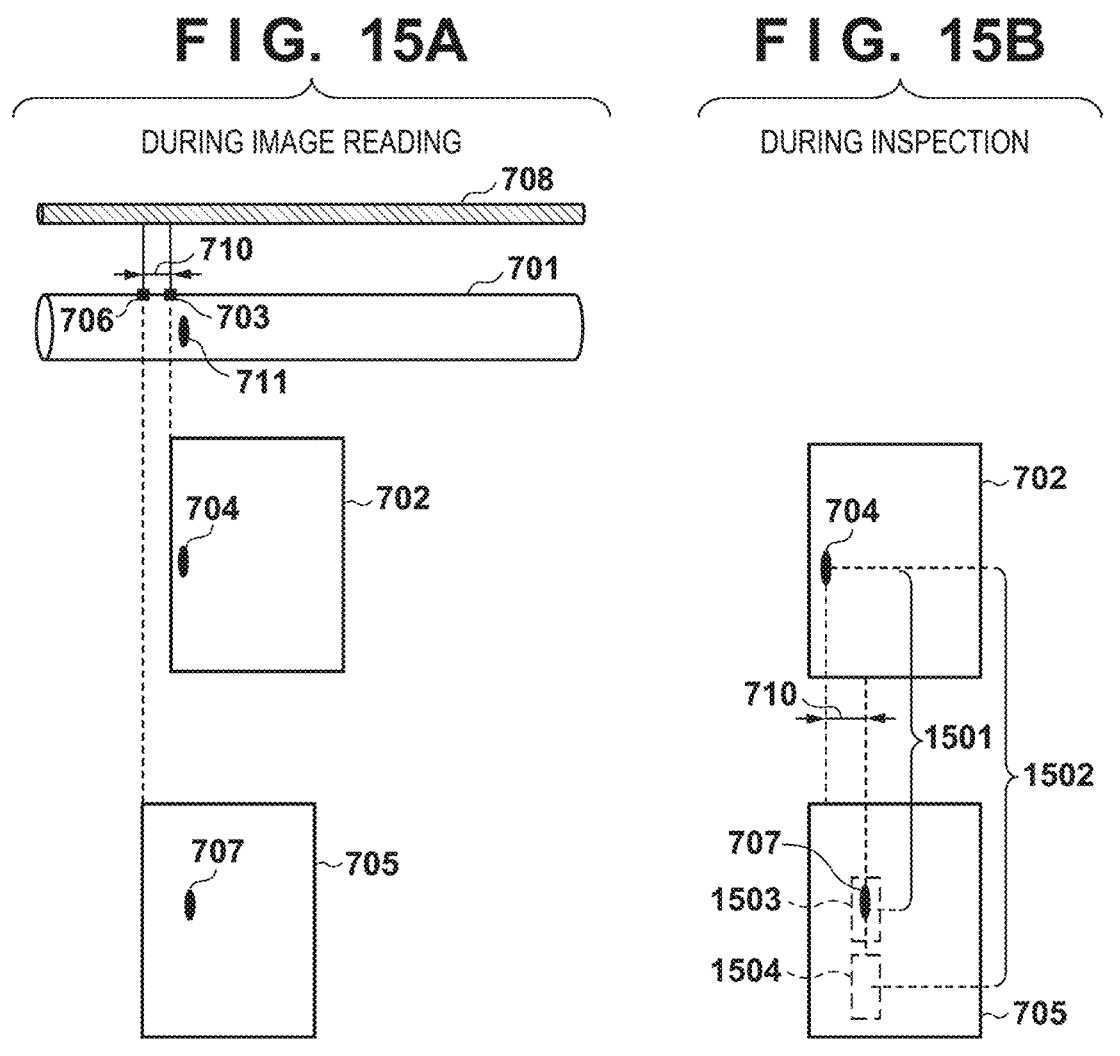

FIGS. 15A and 15B are diagrams illustrating an example in which a laser write start position is obtained as main scanning position related information and period information is used to set a period occurrence range according to the second embodiment.

In step S814, the CPU 214 obtains main scanning position related information. In the second embodiment, the laser write start positions 703 and 706 of FIG. 15A are assumed as the main scanning position related information.

In step S1401, the CPU 214 holds the relationship between part and period distances as illustrated in FIG. 16 and, by sequentially selecting the part, obtains the period information corresponding to the parts, similar to the description in the first embodiment.

Next, in step S1402, the CPU 214 calculates a period distance 1501 and a period distance 1502, which are sub-scanning distances that occur periodically with respect to the image defect 704, based on the period information obtained in step S1401. Next, the processing proceeds to step S1403, and the CPU 214 obtains sub-scanning periodic occurrence ranges 1503 and 1504 based on the main scanning position related information 703 and 706 obtained in step S814 and period distances 1501 and 1502 calculated in step S1402. Here, as illustrated in FIG. 15B, the center coordinates of the periodic occurrence range 1503 in the main scanning direction and the center coordinates of the periodic occurrence range 1504 in the main scanning direction are at positions shifted by the difference 710 of the main scanning position related information from the main scanning position of the image defect 704. The center coordinates in the sub-scanning direction are set to a position where the sub-scanning position of the image defect 704 has been moved by the period distance 1501 and a position where the sub-scanning position of the image defect 704 has been moved by the period distance 1502. The width of the periodic occurrence range 1503 is set based on a concept similar to that of the width which is one of the search conditions of the first embodiment. Furthermore, regarding the height of the periodic occurrence range 1503, a fixed value based on the maximum interval between sheets or a variable value based on the size of the image defect 704, for example, is set.

Then, the processing proceeds to step S1404, and the CPU 214 determines whether there is an image defect similar to the image defect 704 in the periodic occurrence range (1503 and 1504). If it is determined here that there is a similar image defect, the processing proceeds to step S1405. The method of determining whether an image defect is similar is similar to that of the above-described first embodiment, and so, the description will be omitted. In step S1405, if a similar image defect is present in the periodic occurrence range 1503, the image defect 704 coincides with the part period information corresponding to the period distance 1501, and so, the CPU 214 sets that there is a periodicity feature. In addition, if there is a similar image defect in the periodic occurrence range 1504, the image defect 704 coincides with the part period information corresponding to the period distance 1502, and so, the CPU 214 sets that there is a periodicity feature.

Meanwhile, if it is determined in step S1404 that there is no similar image defect, the processing proceeds to step S1406. In step S1406, the CPU 214 sets that the image defect 704 has no periodicity feature and ends the processing. When the processing of either the above-described step S1405 or step S1406 is thus completed, the flowchart (periodicity feature extraction) illustrated in FIG. 14 is ended.

As described above, according to the second embodiment, by extraction of a sub-scanning periodicity feature based on the period information of the parts, it need only be confirmed whether there is a similar image defect in the periodic occurrence range of the image defect, instead of comparing all image defects against each other. Accordingly, in a case when many image defects are detected, the sub-scanning periodicity feature can be efficiently extracted.

Third Embodiment

Next, the printing system according to a third embodiment will be described. In the above-described first and second embodiments, processing in which the main scanning position related information is obtained and the sub-scanning periodicity feature is extracted has been described. In the third embodiment, a form in which continuity information is extracted as a feature amount will be described. The continuity information is a feature amount indicating whether a streak-like image defect is continuously appearing across pages. Since the configuration of the printing system according to the third embodiment is similar to that of the above-described first embodiment, the description thereof will be omitted.

[Continuity Feature Extraction]

Next, the necessity of the continuity feature extraction processing will be described.

FIGS. 18A and 18B are schematic diagrams illustrating continuity feature extraction processing and an example in which a streak-like image defect occurring continuously in the same main scanning position with respect to a part across pages shifts in the main scanning position during inspection according to the third embodiment.

In the printing apparatus 107, there is dustproof glass 2001 between the laser 708 and the photosensitive body 701. If there is dirt 2008 on the dustproof glass 2001, exposure is blocked, and a white streak-like image defect will occur. At this time, image defects 2009 to 2011 will occur continuously on recording materials 2002, 2004, and 2005. The image defects 2009 to 2011 occur at the same main scanning position with respect to the dustproof glass 2001. However, as in the first embodiment, the main scanning position may shift during inspection due to the shift in the write start position, and so, it is difficult to determine whether the image defect is continuous.

Next, the continuity feature extraction processing according to the third embodiment will be described with reference to FIGS. 17, 18A, and 18B.

Figure 17:
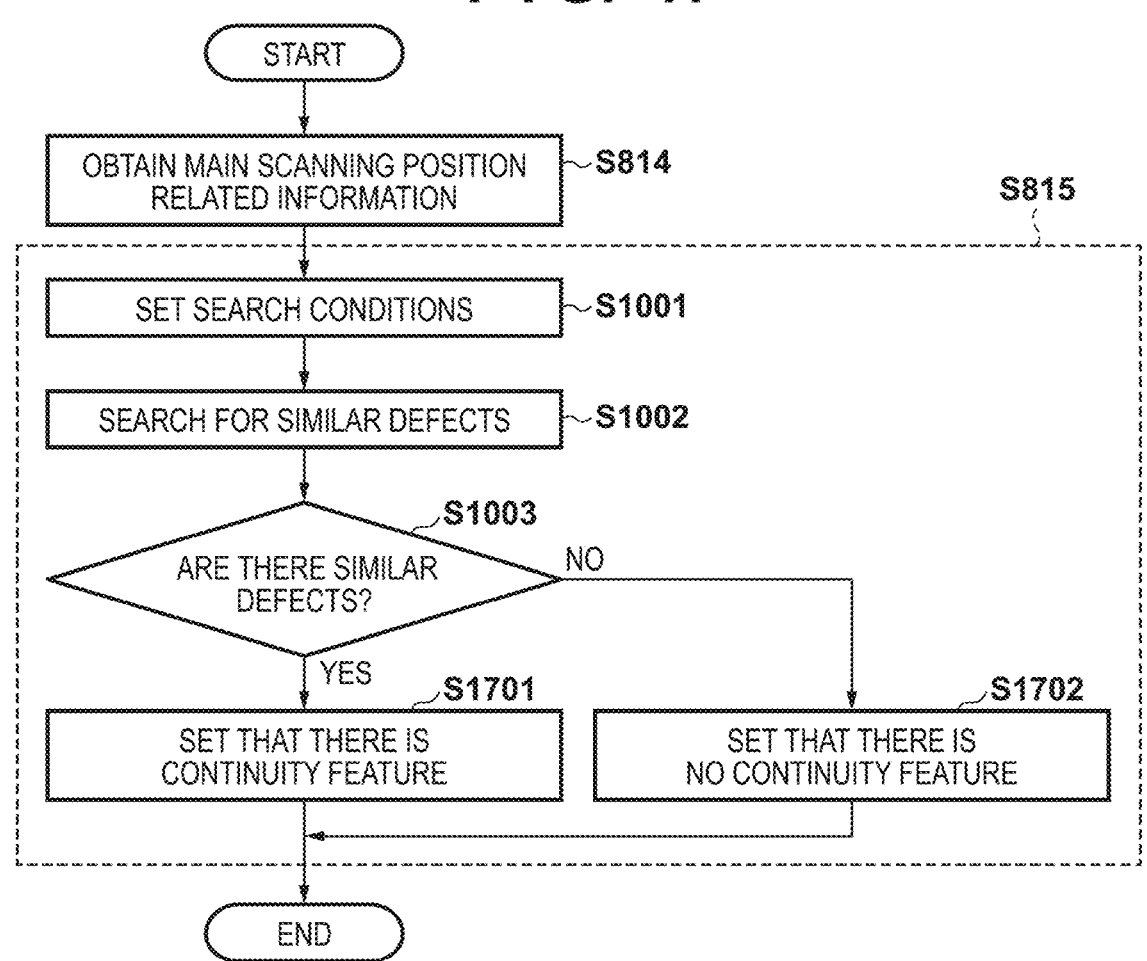
FIG. 17 is a flowchart for explaining a procedure of continuity feature extraction processing according to a third embodiment.

FIG. 17 is a flowchart for explaining a procedure of continuity feature extraction processing according to the third embodiment. FIG. 17 describes image defect feature extraction processing of step S815, which follows main scanning position related information obtainment processing of step S814 of FIG. 8 and is to be performed the inspection apparatus 109 according to the first embodiment, similarly to the above-described FIG. 10. The same reference numerals are assigned for the processes in common with FIG. 10.

In step S814, the CPU 214 obtains main scanning position related information. In the third embodiment, laser write start positions 2003 and 2006 of FIG. 18A are assumed as the main scanning position related information.

Next, in step S1001, the CPU 214 sets search conditions 2012 and 2013, using the main scanning position related information, similarly to the first embodiment, as illustrated in FIG. 18B. A shift amount 2007 is calculated by comparing the laser write start position 2003 of the page 2002 with the laser write start position 2006 of the page 2004. The center coordinates of the search conditions 2012 are set at a position that has been shifted by the shift amount 2007 from the main scanning position of the image defect 2009 of the page 2002. Next, since the write start positions of the page 2002 and the page 2005 are at the write start position 2003 and there is no shift, the center coordinates of the search conditions 2013 are set at the same position as the main scanning position of the image defect 2009.

Next, the processing proceeds to step S1002, and the CPU 214 searches whether there is a streak similar to the image defect 2009 in the search conditions 2012 and 2013. Then, in step S1003, if it is determined that there are similar image defects, the processing proceeds to step S1701, and if it is determined that there are no similar image defects, the processing proceeds to step S1702. In step S1701, the CPU 214 extracts a continuous occurrence of image defects as a feature amount, sets that there is a continuity feature, and ends the processing. In step S1702, since image defects are not occurring continuously, the CPU 214 sets that there is no continuity and ends the processing.

As described above, according to the third embodiment, even if streaks are shifted in the main scanning position during inspection, it is possible to determine that the streaks are a continuous streak by extracting continuity features of image defects while taking a shift in the write start position of the page into account. This makes it possible to reliably identify the cause of an image defect and, by responding thereto based on the identification result, quickly recover the operation of the printing system.

Other Embodiments

Embodiments of the present disclosure can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An inspection system comprising:
a printing apparatus;
an inspection apparatus; and
one or more controllers including one or more processors and one or more memories, the one or more controllers configured:
to cause a reading device of the inspection apparatus to read a printed matter for which the printing apparatus has printed an image on a recording sheet to obtain image data of the image;
to obtain a shift amount between a preceding first recording sheet and a following second recording sheet in a direction orthogonal to a conveyance direction of a recording sheet used by the printing apparatus for printing;
to cause the inspection apparatus to detect an image defect included in the image data obtained by the reading device performing reading; and
to diagnose a failure location of the printing apparatus based on a result of detection by the inspection apparatus,
wherein, in the diagnosis, it is determined whether a continuous image defect has occurred based on a position of an image defect included in the preceding first recording sheet and a position of an image defect included in the following second recording sheet and the obtained shift amount, and the failure location is diagnosed based on the determined continuous image defect.

2. The inspection system according to claim 1, wherein, in the diagnosis, the one or more controllers are further configured to diagnose the failure location based on a distance in the conveyance direction between the position of the image defect included in the preceding first recording sheet and the position of the image defect included in the following second recording sheet.

3. The inspection system according to claim 1, wherein the one or more controllers are further configured to cause the printing apparatus to print an image on the following second recording sheet whose position has been changed in the orthogonal direction according to the shift amount.

4. The inspection system according to claim 1, wherein the image printed on the recording sheet includes an image of cyan, magenta, yellow, and black solid fills.

5. The inspection system according to claim 1, wherein the image defect included in the following second recording sheet is detected in a detection target region on the following second recording sheet.

6. The inspection system according to claim 5, wherein, in the detection by the inspection apparatus, the one or more controllers are further configured to: determine the detection target region of the following second recording sheet based on the position of the image defect of the preceding first recording sheet and the shift amount.

7. The inspection system according to claim 5, wherein the detection target region is further determined based on period information of a component of the printing apparatus.

8. The inspection system according to claim 7, wherein the component includes a photosensitive drum or a developing roller.

9. A method of controlling an inspection system including a printing apparatus and an inspection apparatus, the method comprising:
causing a reading device of the inspection apparatus to read a printed matter for which the printing apparatus has printed an image on a recording sheet to obtain image data of the image;
obtaining a shift amount between a preceding first recording sheet and a following second recording sheet in a direction orthogonal to a conveyance direction of a recording sheet used by the printing apparatus for printing;
causing the inspection apparatus to detect an image defect included in the image data obtained by the reading device performing reading; and
diagnosing a failure location of the printing apparatus based on a result of detection by the inspection apparatus,
wherein, in the diagnosing, it is determined whether a continuous image defect has occurred based on a position of an image defect included in the preceding first recording sheet and a position of an image defect included in the following second recording sheet and the obtained shift amount, and the failure location is diagnosed based on the determined continuous image defect.

10. The method according to claim 9, wherein, in the diagnosing, the failure location is diagnosed based on a distance in the conveyance direction between the position of the image defect included in the preceding first recording sheet and the position of the image defect included in the following second recording sheet.

11. The method according to claim 9, further comprising causing the printing apparatus to print an image on the following second recording sheet whose position has been changed in the orthogonal direction according to the shift amount.

12. The method according to claim 9, wherein the image printed on the recording sheet includes an image of cyan, magenta, yellow, and black solid fills.

13. The method according to claim 9, wherein the image defect included in the following second recording sheet is detected in a detection target region on the following second recording sheet.

14. The method according to claim 13, wherein, in the detection by the inspection apparatus, the detection target region of the following second recording sheet is determined based on the position of the image defect of the preceding first recording sheet and the shift amount.

15. The method according to claim 13, wherein the detection target region is further determined based on period information of a component of the printing apparatus.

16. The method according to claim 15, wherein the component includes a photosensitive drum or a developing roller.

17. A non-transitory computer-readable storage medium storing a program for causing a processor to execute a method of controlling an inspection system including a printing apparatus and an inspection apparatus, the method comprising:

causing a reading device of the inspection apparatus to read a printed matter for which the printing apparatus has printed an image on a recording sheet to obtain image data of the image;

obtaining a shift amount between a preceding first recording sheet and a following second recording sheet in a direction orthogonal to a conveyance direction of a recording sheet used by the printing apparatus for printing;

causing the inspection apparatus to detect an image defect included in the image data obtained by the reading device performing reading; and diagnosing a failure location of the printing apparatus based on a result of detection by the inspection apparatus, wherein, in the diagnosing, it is determined whether a continuous image defect is occurred based on a position of an image defect included in the preceding first recording sheet and a position of an image defect included in the following second recording sheet and the obtained shift amount, and the failure location is diagnosed based on the determined continuous image defect.

* * * * *